US009959641B1

(12) United States Patent
Olsson et al.

(10) Patent No.: US 9,959,641 B1
(45) Date of Patent: May 1, 2018

(54) METHODS AND SYSTEMS FOR SEAMLESS TRANSITIONING IN INTERACTIVE MAPPING SYSTEMS

(71) Applicants: Mark S. Olsson, La Jolla, CA (US); Michael J. Martin, San Diego, CA (US); Thomas C. Cassey, Manteca, CA (US); Francisco A. Crespo, San Diego, CA (US)

(72) Inventors: Mark S. Olsson, La Jolla, CA (US); Michael J. Martin, San Diego, CA (US); Thomas C. Cassey, Manteca, CA (US); Francisco A. Crespo, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 0 days. days.

(21) Appl. No.: 14/802,791

(22) Filed: Jul. 17, 2015

Related U.S. Application Data

(60) Provisional application No. 62/026,010, filed on Jul. 17, 2014.

(51) Int. Cl.
G06T 11/20 (2006.01)
G06F 3/0482 (2013.01)
G06F 3/0484 (2013.01)

(52) U.S. Cl.
CPC ............ *G06T 11/20* (2013.01); *G06F 3/0482* (2013.01); *G06F 3/04845* (2013.01)

(58) Field of Classification Search
None
See application file for complete search history.

(56) References Cited

U.S. PATENT DOCUMENTS

2010/0265176 A1* 10/2010 Olsson ..................... G05G 5/05
345/161
2010/0325589 A1* 12/2010 Ofek ..................... G01C 21/367
715/854
2012/0110019 A1*  5/2012 Nielsen .................. G06Q 50/08
707/781
2013/0321401 A1* 12/2013 Piemonte ........... G01C 21/3635
345/419

* cited by examiner

*Primary Examiner* — Peter Hoang
(74) *Attorney, Agent, or Firm* — Heena Sharma; Steven C. Tietsworth, Esq.

(57) ABSTRACT

Methods and systems are disclosed for providing displays of maps or mapping objects in a mapping application or system, wherein transitions between the maps or mapping objects is provided seamlessly and/or with orientation(s) preserved based a user interface device control actuation.

22 Claims, 14 Drawing Sheets

METHODS AND SYSTEMS FOR SEAMLESS TRANSITIONING IN INTERACTIVE MAPPING SYSTEMS

CROSS-REFERENCE TO RELATED APPLICATIONS

This application claims priority under 35 U.S.C. § 119(e) to co-pending U.S. Provisional Patent Application Ser. No. 62/026,010, entitled METHODS AND SYSTEMS FOR GENERATING INTERACTIVE MAPPING DISPLAYS IN CONJUNCTION WITH USER INTERFACE DEVICES, filed Jul. 17, 2014, the content of which is incorporated by reference herein in its entirety for all purposes.

FIELD

This disclosure relates generally to methods and systems for providing interactive computerized/virtual map and image information in conjunction with user interface devices (UIDs). More specifically, but not exclusively, the disclosure relates to methods for controlling view transitions between various maps and/or map applications or systems based on control signaling from a UID so as to provide seamless consistent display transitions, as well as systems for implementing such methods.

BACKGROUND

Computerized/virtual maps have become important tools for use in navigating the Earth and universe. Some such map applications/systems, such as virtual globe applications, allow the user an immersive environment to experience and explore aspects of the world, oceans, and/or other planets and celestial bodies through the convenience of a personal computer or other electronic computing device. One very popular current version of such an application is Google Earth; however, Apple and other companies provide similar applications, data, and systems.

In many instances, such applications have grown in complexity to the extent that controls have become cumbersome and/or functionality of the map system(s) is sacrificed due to a lack of adequate controls with commonly used UIDs such as computer mice. Furthermore, some uses of computerized/virtual maps require the use of multiple maps and/or map applications/systems in coordination. In such uses, transitioning between the various maps and/or map applications/systems is often slow, unintuitive, and/or disruptive from the immersive experience. The use of multiple map applications/systems may further require a user to master a different control scheme for each individual map and/or map application/system.

Accordingly, there is a need in the art to address the above-described as well as other problems.

SUMMARY

This disclosure relates generally to methods and systems for providing interactive computerized/virtual map and image information in conjunction with user interface devices (UIDs). More specifically, but not exclusively, the disclosure relates to methods for controlling view transitions between various maps and/or map applications or systems based on control signaling from a UID so as to provide seamless consistent display transitions, as well as systems for implementing such methods.

For example, in one aspect, the disclosure relates to methods for providing controlled, seamless and consistent transitions between various maps and/or map applications/systems using one or more user interface devices (UIDs). In an exemplary embodiment, a multi-axis magnetically sensed UID may advantageously be used.

In another aspect, the disclosure relates to methods for providing a seamless transition between mapping objects in a mapping application. The method may include, for example, rendering, on a display, a first mapping object. The method may include receiving, from a user interface device, control signal data. The control signal data may define a control action. The method may include determining, based at least on part on the control action, a second mapping object to render. The method may include rendering the second mapping object on the display. The UID may be a multi-axis UID. The multi-axis UID may sense motion in six or more degrees of freedom. The six or more degrees of freedom may include vertical up and down (Z-axis) motions, X axis motions, Y axis motions, rotations, and/or deformations.

In another aspect, the disclosure relates to use of a single common control scheme and UID within the various computerized/virtual maps and map applications/systems to provide seamless transitions. Some embodiments may use a body centric control scheme to intuitively control movements within the various computerized/virtual maps and map applications/systems. In such a control scheme, movement and rotations may be relative to the apparent position and orientation in the virtual map space. In alternate embodiments, other control schemes may be used and/or may be selectable and/or customizable by the user.

In another aspect, the disclosure relates to methods for seamless transitioning between different maps and/or map applications/systems based on a change in altitude or Z axis location. Such methods may preserve the position and/or orientation in transitions from one map to the next. These methods may further include mechanisms to indicate such a transition to a user and/or users. For instance, transitions between different map databases within one or more map applications/systems may include haptic feedback and/or flashes of light from the UID and/or audio alerts and/or virtual indicators within the map application/system or other indicators.

In another aspect, the disclosure relates to map systems and methods for displaying and transitioning between computerized/virtual maps containing buried utility information and/or other embedded information. Such methods may preserve the position and/or orientation in transitioning between maps while providing seamless transitions.

In another aspect, the disclosure relates to a method for transitioning between any overview and detailed map where the method preserves the position and/or orientation in transitioning between maps. Such a method may be used in the mapped surface of any scale-dependent visualization.

In another aspect, the disclosure relates to non-transitory processor readable media including instructions for implementing methods and functions described herein, in whole or in part.

In another aspect, the disclosure relates to devices or systems for implementing methods and functions described herein, in whole or in part.

In another aspect, the disclosure relates to means for implementing the methods and functions described herein, in whole or in part.

Various additional aspects, features, devices, systems, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Terminology

Figure 1A:
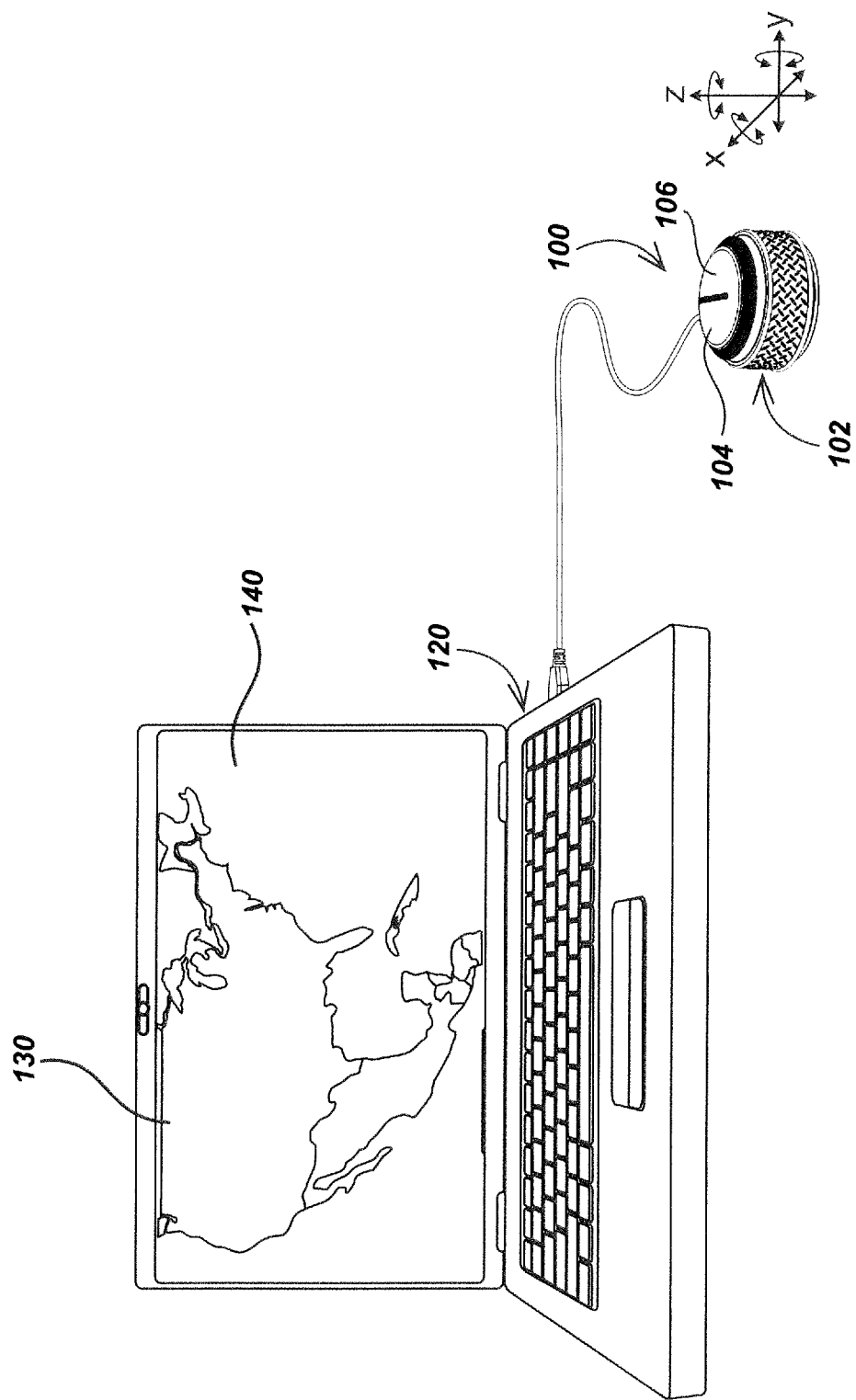
FIG. 1A is an illustration of an embodiment of a system including a user interface device (UID) connected to an electronic computing device on which an embodiment of a map application is implemented in whole or in part.

As used herein, the terms "map" or "mapping object" refer to imagery, diagrams, graphical illustrations, line drawings or other representation depicting the attributes of a location, which may include maps or images containing various dimensions (i.e. two dimensional maps or images and/or three dimensional maps or images). These may be vector or raster objects and/or combinations of both. Such depictions and/or representations may be used for navigation and/or relaying information associated with positions or locations, and may also contain information associated with the positions or locations such as coordinates, information defining features, images or video depictions, and/or other related data or information. For instance, the spatial positioning of ground surface attributes may be depicted through a series of photographs or line drawings or other graphics representing a location. Various other data may be imbedded or otherwise included into maps including, but not limited to, reference coordinate information, such as latitude, longitude, and/or altitude data, topographical information, virtual models/objects, information regarding buried utilities or other associated objects or elements, structures on or below the surface, and the like. The terms "map" or "mapping object" may further include various locations above or below the surface of the Earth. For instance, a map may be used to depict spatial relationships within outer space, within the sea/oceans, subterranean locations, buildings or other structures, machines, the human body or other organisms, or on or within other real or virtual objects, devices, systems, organisms, and the like. Furthermore, other scale-dependent visualizations may be considered "maps" as used herein. For instance, virtual models of DNA protein structures, chemical bonds, or other such representations may be considered as maps or mapping objects.

The terms "map application" and "map system" may further refer to computer software, systems, devices, or other apparatus configured to carry out the map methods as described herein and may include software, hardware, data, and/or firmware to receive, send, generate, modify, display, store, and/or otherwise use or manipulate maps or mapping objects. In some embodiments, the map application(s) or map system(s) may be software stored on a non-transitory tangible medium within or coupled to a computer or other electronic computing device configured to carry out such methods as described herein, such as in a memory chip or array, hard drive, or other memory storage device or system. In some embodiments, the map and/or map application/system may include one or more image bubbles that may provide an image view of a location. Such an image bubble may be a panoramic or other photographic or other raster or vector-based representation of a location or object. In some such embodiments, a series of image bubbles, which may be related (such as by being adjacent or consecutive in space or time, etc.) may be used.

The term "altitude" as used herein refers to a vertical distance and/or a degree or level of zoom from the ground or other mapped surface location or reference location or position.

The term "high altitude" may refer to an elevated distance and/or degree of zoom whereby an overview of a location or map may be displayed, such as would be visible from an aerial vehicle such as an unmanned drone, helicopter, airplane, satellite, and the like. For instance, a view from outer space, an airplane and/or drone in flight, a map or other depiction of an entire city or mountain range may all be considered "high altitude" when presented as being above the Earth or other reference location or features.

The terms "low altitude", "near ground-level", "ground-level", "ground map", and "near ground-level map" may refer to a location near to a mapped surface displaying a high degree of surface detail. Such a location may typically be one slightly elevated from the ground surface displaying a high level of details of the mapped surface and surrounding areas or only slightly above or elevated the Earth or other reference locations or features. For instance, an eye-level vantage point may be considered "low altitude" and/or "near ground-level" when rendered as a person would see something from the ground or near to the ground or other surface or feature. A map comprised of depictions from such a vantage point may be considered a "ground map" or "near ground-level map." Furthermore, a near ground-level map and/or map application/system may be comprised of one or more image bubbles as described previously.

The term "overview map" as used herein refers to a map that's distance and/or a degree or level of zoom from the mapped surface location is such that the map provides a general overview of the location or other surface or feature.

The term "detailed map" as used herein refers to a close distance and/or degree or level of zoom to the mapped surface location, surface or feature that provides a heightened level of detail(s) not readily apparent or visible in the overview map.

The terms "electronic computing device" and "electronic computing system" as used herein refers to any device or system that can be operated or controlled by electrical, optical, or other outputs from a user interface device such as the various UID embodiments described and referenced herein. Examples of an electronic computing system include, but are not limited to; personal computers, notebook or laptop computers, navigation systems such as global positioning system receivers, personal digital assistants (PDAs), cellular phones, computer tablet devices, electronic test or measurement equipment including processing elements, and/or other similar systems or devices that receive user inputs and perform operations involving processing the received inputs to generate data or information, display or store the data or information, generate or control electronic outputs, send data or information, or otherwise use UID output signals to perform some function or operation which may typically include control over one or more map applications/systems. In some embodiments, the map application(s)/system(s) may exist as software stored on a non-transitory tangible medium disposed in or coupled to the electronic computing device/system. Electronic computing devices or systems may also be modules or subsystems of larger devices or systems.

The term "processing element" as used herein refers to a device or apparatus configured to carry out programmable steps and/or other functions associated with the methods described herein by processing instructions, typically in the form of coded or interpreted software instructions. For instance, a processing element as described may be implemented or performed with a general purpose processor, a digital signal processor (DSP), an application specific integrated circuit (ASIC), a field programmable gate array (FPGA) or other programmable logic device, discrete gate or transistor logic, discrete hardware components, memory elements, or any combination(s) thereof designed to perform the methods and functions described herein.

The terms "displace" and "displacement," as used herein in reference to the user interface devices and elements thereof, such as actuators, refer to various manual movements from a neutral or released state position, including, but not limited to, lateral movements of the actuator along the X and Y axes, vertical movements along the Z axis, tilting, rotation, squeeze and/or actuator deformation movements, and permutations and combinations thereof.

As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

Overview

This disclosure relates generally to methods and systems for providing interactive computerized/virtual map and image information in conjunction with user interface devices (UIDs). More specifically, but not exclusively, the disclosure relates to methods for controlling view transitions between various maps and/or map applications or systems based on control signaling from a UID so as to provide seamless consistent display transitions, as well as systems for implementing such methods.

Details of various user interface devices (UIDs) that may be used in mapping application and system embodiments in conjunction with the disclosures herein are described in co-assigned patent applications including U.S. patent application Ser. No. 12/756,068, filed on Apr. 7, 2010, entitled MAGNETIC MANUAL USER INTERFACE DEVICES, U.S. patent application Ser. No. 13/110,910, filed May 18, 2010, entitled USER INTERFACE DEVICES, APPARATUS, AND METHODS, U.S. patent application Ser. No. 13/590,099, filed Aug. 20, 2011, entitled MAGNETIC SENSING USER INTERFACE DEVICE METHODS AND APPARATUS USING ELECTROMAGNETS AND ASSOCIATED MAGNETIC SENSORS, U.S. patent application Ser. No. 13/272,172, filed Oct. 12, 2011, entitled MAGNETIC THUMBSTICK DEVICES, U.S. patent application Ser. No. 13/292,038, filed Nov. 8, 2011, entitled SLIM PROFILE MAGNETIC USER INTERFACE DEVICES, U.S. patent application Ser. No. 13/310,670, filed Dec. 2, 2011, entitled MAGNETICALLY SENSED USER INTERFACE APPARATUS AND DEVICES, U.S. patent application Ser. No. 14/281,761, filed on May 19, 2014, entitled USER INTERFACE DEVICES, and U.S. patent application Ser. No. 14/294,068, filed on Jun. 2, 2014, entitled DEFORMABLE USER INTERFACE DEVICES, APPARATUS, AND METHODS. The content of each of these applications is hereby incorporated by reference herein in its entirety. These applications may be referred to subsequently herein collectively as the "incorporated applications." In an exemplary embodiment, UIDs having at least six degrees of freedom control may be used.

This disclosure relates generally to methods for computerized/virtual maps and map applications/systems. More specifically, but not exclusively, the disclosure relates to methods which may be used to control transitioning between various maps and/or map applications/systems using control signaling from one or more user interface devices (UIDs).

The computerized/virtual maps and map applications/systems herein typically include at least two maps or map objects of a common location or locations with a degree of overlap, each of which may contain a different degree of detail(s), different features, different elements, and the like. In an exemplary embodiment, an electronic computing device or system will render, on a display, a representation such as an image or video of a mapped area based on maps or mapping objects, and, in response to a user-provided control action via a UID, will determine a second map or mapping object to render, which will then be render on the display, typically in a seamless transition. The transition may be done so as to preserve a particular view or orientation between the mapping objects. For instance, in a Google Earth application a user may be provided with a display from a high-level view and, responsive to inputs provided from the user via a UID, may seamlessly transition to a low-level view, such as to a Google Earth street view or other view. Similar functionality may be implemented with other mapping applications/systems and other surfaces or objects aside specifically from Earth-oriented imagery such as provided by Google Earth.

For example, in one aspect, the disclosure relates to methods for providing controlled, seamless and consistent transitions between various maps and/or map applications/systems using one or more UIDs. In an exemplary embodiment, a multi-axis magnetically sensed UID may advantageously be used in conjunction with an electronic computing system including a display to display maps seamlessly through transitions between maps or related images. In an exemplary embodiment, a method for providing a seamless transition between mapping objects in a mapping application is disclosed. The method may include, for example, rendering, on a display, a first mapping object. The method may include receiving, from a user interface device, control signal data. The control signal data may define a control action. The method may include determining, based at least on part on the control action, a second mapping object to render. The method may include rendering the second mapping object on the display. The UID may be a multi-axis UID. The multi-axis UID may sense motion in six or more degrees of freedom. The six or more degrees of freedom may include vertical up and down (Z-axis) motions, X axis motions, Y axis motions, rotations, and/or deformations.

In another aspect, the disclosure relates to use of a single common control scheme and UID within the various computerized/virtual maps and map applications/systems to provide seamless transitions. Some embodiments may use a body centric control scheme to intuitively control movements within the various computerized/virtual maps and map applications/systems. In such a control scheme, movement and rotations may be relative to the apparent position and orientation in the virtual map space. In alternate embodiments, other control schemes may be used and/or may be selectable and/or customizable by the user.

In another aspect, the disclosure relates to methods for seamless transitioning between different maps and/or map applications/systems based on a change in altitude or Z axis location. Such methods may preserve the position and/or orientation in transitions from one map to the next. These methods may further include mechanisms to indicate such a transition to a user and/or users. For instance, transitions between different map databases within one or more map applications/systems may include haptic feedback and/or flashes of light from the UID and/or audio alerts and/or virtual indicators within the map application/system or other indicators.

In another aspect, the disclosure relates to map systems and methods for displaying and transitioning between computerized/virtual maps containing buried utility information and/or other embedded information. Such methods may preserve the position and/or orientation in transitioning between maps while providing seamless transitions.

In another aspect, the disclosure relates to a method for transitioning between any of various overview and detailed maps where the method preserves the position and/or orientation in transitioning between maps. Such a method may be used in the mapped surface of any scale-dependent visualization.

In another aspect, the disclosure relates to methods for providing a seamless transition between particular mapping objects in a mapping application. The method may include, for example, rendering, on a display, a first mapping object. The method may include receiving, from a user interface device, control signal data. The control signal data may define a control action. The method may include determining, based at least on part on the control action, a second mapping object to render. The method may include rendering the second mapping object on the display. The UID may be a multi-axis UID. The multi-axis UID may sense motion in six or more degrees of freedom. The six or more degrees of freedom may include vertical up and down (Z-axis) motions, X axis motions, Y axis motions, rotations, and/or deformations.

The mapping application may, for example, be a Google Earth application. The mapping application may be hosted on a server system or provided from a server system to a client system or hosted on a client system. The mapping application may be an Apple Maps application or other application for displaying mapping or object or surface information. The first mapping object may be an aerial map, and the second mapping object may be a Street View map. The first mapping object may be a Street View map and the second mapping object may be an aerial map. The first mapping object may comprise a vector-based map. The first mapping object may comprise a raster-based map. The second mapping object may comprise a vector-based map. The second mapping object may comprise a raster-based map.

The second mapping object may, for example, be determined further based in part on data provided from the mapping application. The data provided from the mapping application may be altitude data. The data provided from the mapping application may be data defining a distance above a reference surface or point. The data provided from the mapping application may be data defining an orientation in the mapping application or of an image or images provided from the mapping application. The data provided from the mapping application may be data defining a velocity associated with the mapping application or an image or images provided from the mapping application. The data provided from the mapping application may be directional orientation data associated with the mapping application or an image or images provided from the mapping application.

The control signal may, for example, be provided responsive to an upward or downward movement of an actuator element of the UID. The second mapping object may be rendered substantially seamlessly from the rendering of the first mapping object. The orientation may be preserved between the rendering of the first mapping object and the rendering of second mapping object. The orientation may be an X-Y coordinate orientation or directional orientation on a plane associated with a ground surface. The orientation may be a horizontal, azimuthal or elevation orientation associated with a view provided from the mapping application. The orientation may be a compass heading. The orientation may be an elevation or attitude.

The method may further include, for example, receiving, from a second UID control signal second data defining a second control action. The method may further include determining, based at least in part on the second control action, a third mapping object to render. The method may further include rendering the third mapping object on the display.

A common control scheme or method may be employed within the various computerized/virtual maps and map applications/systems and utilized for control thereof to provide seamless transitioning between maps or mapping elements. In some embodiments, a body centric control scheme may be used to intuitively control movements within the various computerized/virtual maps and map applications/systems. In such a control scheme, movement and rotations may be relative to the apparent position and orientation in the virtual map space. In alternate embodiments, other control schemes may be used and/or may be selectable and/or customizable by the user.

A typical method as disclosed herein for transitioning between different maps and/or map applications/systems may use one or more high altitude maps or mapping objects and one or more near ground-level map or mapping objects, which may include geo-referenced images and/or other images, vectors, or other data. A set of predetermined altitude or Z axis tolerance level values may be determined for each map and/or map application/system and/or map area, location, or zone. In use, if movement within the displayed map falls within this predetermined tolerance level, a transition to the other map or map application/system may occur. During such a transition, the heading and X axis position and Y axis position (i.e. latitudinal and longitudinal position, zoom, and/or view magnification) may be preserved from one map or map application/system to the other. This method may indicate when such a transition has occurred to a user and/or users. For instance, transitions between a high altitude map or map application/system and a near ground-level map or map application/system may include haptic feedback and/or flashes of light from the UID and/or audio alerts and/or virtual indicators on the display to alert the user(s) of the occurrence of such a transition.

In yet further methods and systems, proximity in a common coordinate set between two maps and/or map applications/systems is described. Such a method may not be dependent upon altitude to trigger a transition between such maps and/or map applications/systems but may instead rely on proximity.

In another aspect, the disclosure relates to non-transitory processor readable media including instructions for implementing methods and functions described herein, in whole or in part.

In another aspect, the disclosure relates to devices or systems for implementing methods and functions described herein, in whole or in part.

In another aspect, the disclosure relates to means for implementing the methods and functions described herein, in whole or in part.

Various additional aspects, features, and functions are described below in conjunction with FIGS. 1A through 11 of the appended Drawings.

Example Map Methods and User Interface Device Embodiments

The methods disclosed herein may include the use of a user interface device (UID) configured for six or greater degrees of freedom control. In such a UID, user input may result in output signaling to electronic computing devices corresponding to movements within the map space and/or selection of menu items and/or manipulation of virtual objects further within a map application/system. In some embodiments, the UID may further be configured to produce output signals from squeezing/deformation displacements of an actuator that may be analogous to the degree and direction of the squeeze/deformation. As described in FIGS. 1A and 1B, the UID 100 may be of the type with such a deformable actuator. Various aspects of an exemplary UID embodiment 100 are described in co-assigned patent application U.S. patent application Ser. No. 14/294,068, filed on Jun. 2, 2014, entitled DEFORMABLE USER INTERFACE DEVICES, APPARATUS, AND METHODS, the content of which is hereby incorporated by reference herein in its entirety. Other examples UIDs that may be also be used are described in various of the incorporated applications. With UID 100, a user's hand (not illustrated) may grip about the actuator 102 (FIG. 1A) and displace the actuator 102 (FIG. 1A) in movements along the X and Y axes, vertical movements along the Z axis (e.g., lifting the actuator up to move upward or down to move downward on the map view), tilting, rotation about X, Y, and/or Z axes, squeeze actions, and/or permutations or combinations thereof.

Figure 1B:
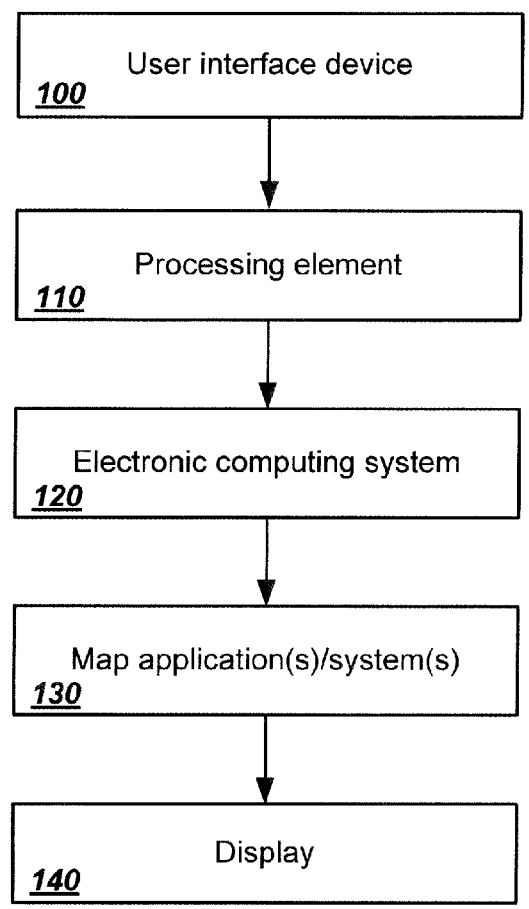
FIG. 1B illustrates details of an embodiment of a method of data flow to a display in a mapping application system.

The UID 100 may be configured such that displacements of the actuator 102 (FIG. 1A) may create one or more sensor output signals (e.g., from magnetic sensing elements in some embodiments of UIDs, such as those described in the incorporated applications), that are then used as input signals to a processing element 110 (FIG. 1B). The processing element 110 (FIG. 1B) may then interpret such input signals and generate output control signals that may further be communicated to an electronic computing device, such as the computing device 120. These control signals may be used by mapping applications/systems executed on or in conjunction with the electronic computing device or system to provide seamless display rendering between maps or mapping objects.

In the various embodiments herein, electronic computing devices and systems may include, but are not limited to; electronic map and/or navigation systems, satellite navigation systems such as global positioning systems (GPS), personal computers, notebook or laptop computers, personal digital assistants (PDAs), cellular phones, computer tablet devices, and/or other electronic devices/systems that may receive user inputs and perform operations involving processing the received inputs to generate data or information, display or store the data or information, generate and/or control electronic outputs, send data or information, or otherwise use UID output signals received from the UID to perform some function or operation. Such an electronic computing device or system may further be configured to generate output signal to one or more map applications/systems such as the computerized map application 130.

The map application/system may further provide an output signal or signals to a display or otherwise indicate mapping/navigation information to a user. For instance, as illustrated in FIG. 1A, a computerized map application 130 may include maps or mapping objects rendered on a display, such as the display 140 of the computing device 120. The map applications/systems, such as the computerized map application 130 of FIG. 1A, may be software embedded in or coupled to the electronic computing system. Output control signals from displacements of the actuator 102 on UID 100 defining a control action may be used for control over the computerized map 130. In some embodiments, the directions and degree of movements and rotations of an actuator, such as the actuator 102, may control movements and rotations within a configured computerized/virtual map, such as the computerized map 130. Additional output control signals may also be produced through clicking of left button 104, clicking of right button 106, and/or squeeze/deformation displacements of actuator 102. Such output control signals may further be used to control aspects of the computerized map 130. For instance, a squeeze of the actuator 102 and/or click of the left and/or right buttons 104 and 106 may indicate the selection and/or manipulation of a virtual object and/or menu and/or additional movement control and/or control over other aspects of the map application and/or system.

In the various different map applications and/or systems described herein, a user interface device with six or greater degrees of freedom control, such as the UID 100 of FIG. 1, may be configured such that user input may result in identical or nearly identical control within various different map application/systems. For instance, in the high altitude map 200 illustrated in FIG. 2A and the near ground-level map 210 of FIG. 2B, a user input gesture resulting in a movement within the high altitude map 200 may result in the same or analogous movement in the near ground-level map 210 when the same user input gesture is used. In some such embodiments, such controls may be body centric and relative to the position and orientation in the virtual map space displayed to the user. For instance, despite the angle of perspective displayed, a downward movement of an actuator may always indicate a movement in an analogous direction along a Z axis relative to the apparent perspective displayed to the user. In other embodiments, controls may be configured to be relative to the UID's position in space rather than the position and orientation in the virtual map space displayed to the user. For instance, despite the angle of perspective displayed, a downward movement of an actuator may always indicate a downward movement towards the ground surface or other mapped location surface. In yet further embodiments, other control schemes may be used and/or may be selectable and/or customizable by the user.

Figure 2A:
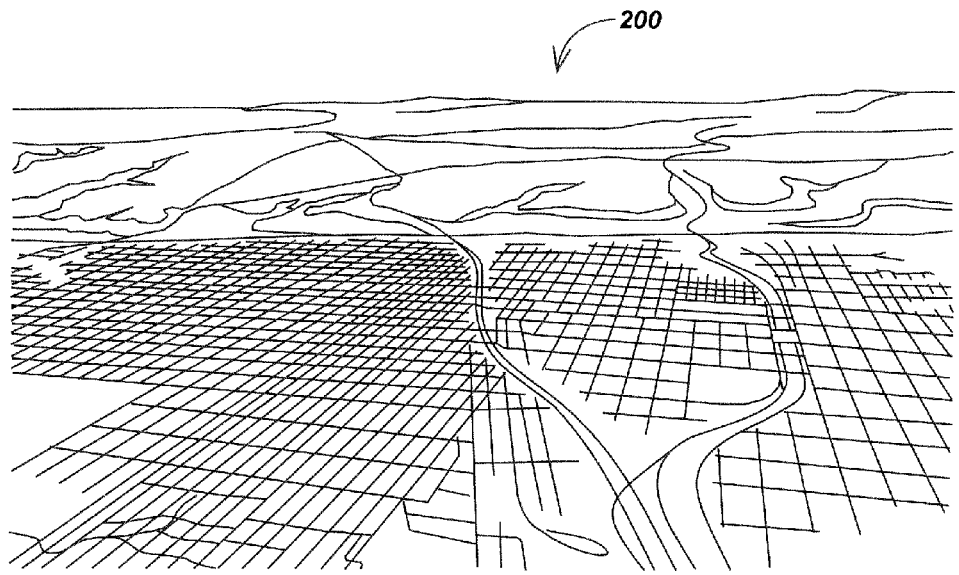
FIG. 2A illustrates an example high altitude map from a high altitude map application/system.

Referring to FIG. 2A, examples of map applications that may include maps such as the high altitude map 200 may be found through various open source software programs such as the World Wind and Blue Marble publicly available from the National Aeronautics and Space Administration (NASA). Other suitable publicly available applications and/or software programs may include, but are not limited to, Google Earth and/or Google Maps from Google Inc., Bing Maps from Microsoft Corporation, and Apple Maps from Apple Inc. In other embodiments, any similar map application, system, and/or software program including virtual globe programs may be considered a high altitude map application such as the high altitude map 200 of FIG. 2A. In yet further examples, such high altitude maps may be comprised of one or more aerial photographs, depictions, or representations of a location typically from an elevated distance, vector representations from such a high altitude, or other data or information that provide or define an overhead view of the location site.

These aerial photographs, depictions, and/or representations may be assembled together and configured by an electronic computing device to function as a map application/system, interactions with which may be controlled by an UID such as UID 100 of FIGS. 1A and 1B. In such embodiments where a high altitude map is comprised of one or more aerial photographs, depictions, vector representations and/or other representations of a location, UID controls along vertical Z axis may allow for analogous zooming inward or outward of the map. In some such embodiments, altitude may be considered a degree of zoom into the high altitude map. For example, in a UID such as those described in the incorporated applications, a user action of pushing downward on a actuator may result in transition of the rendered output display so that the displayed map or mapping object(s) appears to be increasing close to the ground or other reference surface or object, whereas an action of pulling up on the actuator causes the opposite presentation (i.e., zooming out or seeing a higher elevation view). An exemplary such mapping application and presentation is the standard Google Earth display, where a user may zoom in by pushing the actuator downward to a view on or hear the ground surface, and conversely may zoom out by pulling the actuator upward to see a depiction of the entire Earth as from space.

Figure 1C:
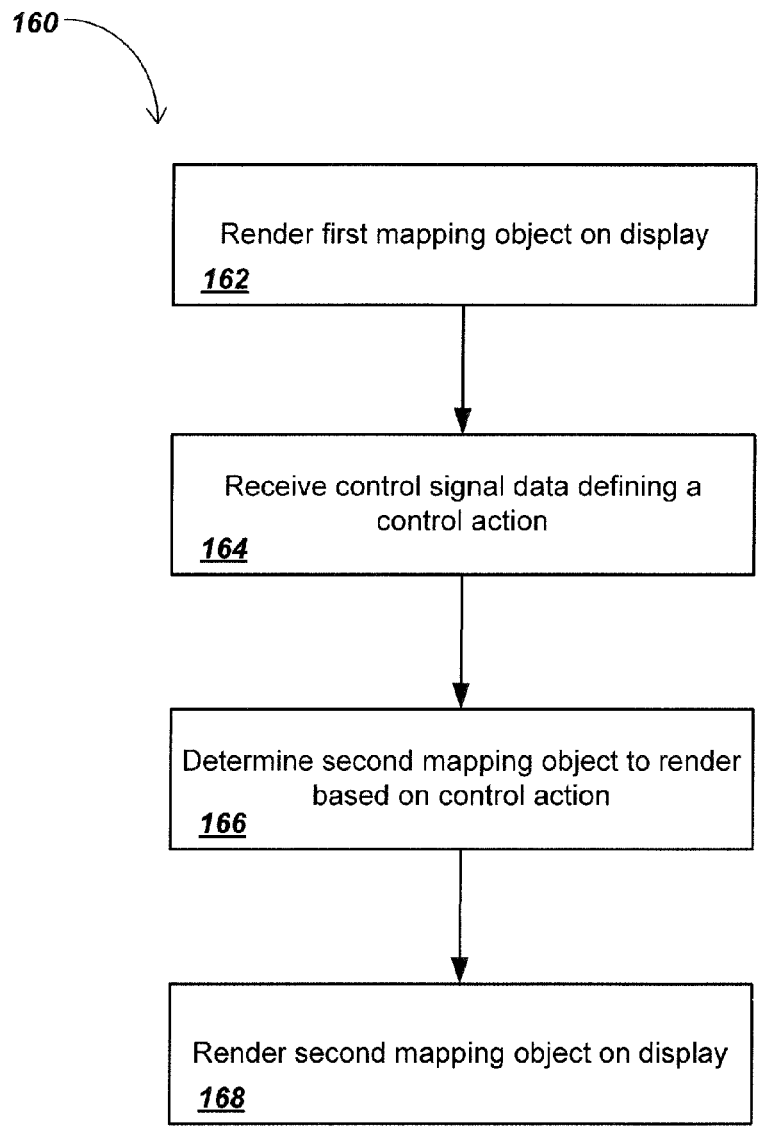
FIG. 1C illustrates details of an embodiment of a method for implementing a seamless transition in a mapping application/system.

FIG. 1C illustrates details of an embodiment 160 of a process for providing a seamless transition between maps or mapping objects in a mapping application or system. For example, at step 162, the process may include rendering, on a display device such as an LCD or other display, a first mapping object. At step 164, a control signal including control signal data may be received from a UID. The control signal data may define a control action, such as an up/down motion or other motion associated with a displayed output provided on the display device. The control signal may be provided from the UID to a mapping application or system. The process may further include determining, based at least on part on the control action, a second mapping object to render at step 166. At stage 168, the second mapping object may be rendered on the display. The UID may be a multi-axis UID. The multi-axis UID may sense motion in six or more degrees of freedom. The six or more degrees of freedom may include vertical up and down (Z-axis) motions, X axis motions, Y axis motions, rotations, and/or deformations.

The mapping application may, for example, be a Google Earth application. The mapping application may be hosted on a server system or provided from a server system to a client system or hosted on a client system. The mapping application may be an Apple Maps application or other application for displaying mapping or object or surface information. The first mapping object may be an aerial map, and the second mapping object may be a Street View map. The first mapping object may be a Street View map and the second mapping object may be an aerial map. The first mapping object may comprise a vector-based map. The first mapping object may comprise a raster-based map. The second mapping object may comprise a vector-based map. The second mapping object may comprise a raster-based map.

The second mapping object may, for example, be determined further based in part on data provided from the mapping application. The data provided from the mapping application may be altitude data. The data provided from the mapping application may be data defining a distance above a reference surface or point. The data provided from the mapping application may be data defining an orientation in the mapping application or of an image or images provided from the mapping application. The data provided from the mapping application may be data defining a velocity associated with the mapping application or an image or images provided from the mapping application. The data provided from the mapping application may be directional orientation data associated with the mapping application or an image or images provided from the mapping application.

The control signal may, for example, be provided responsive to an upward or downward movement of an actuator element of the UID. The second mapping object may be rendered substantially seamlessly from the rendering of the first mapping object. The orientation may be preserved between the rendering of the first mapping object and the rendering of second mapping object. The orientation may be an X-Y coordinate orientation or directional orientation on a plane associated with a ground surface. The orientation may be a horizontal, azimuthal or elevation orientation associated with a view provided from the mapping application. The orientation may be a compass heading. The orientation may be an elevation or attitude.

The method may further include, for example, receiving, from a second UID control signal second data defining a second control action. The method may further include determining, based at least in part on the second control action, a third mapping object to render. The method may further include rendering the third mapping object on the display.

Figure 2B:
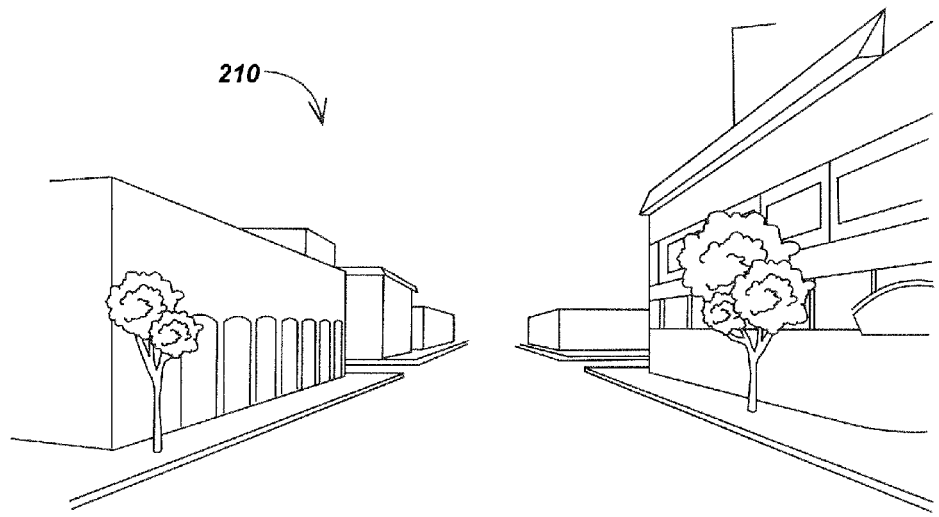
FIG. 2B illustrates an example near ground-level map from a near ground-level map application/system.

Referring to FIG. 2B, the near ground-level map 210 may, for example, be from a mapping system and/or application comprised of near ground-level photographs, depictions, and/or other representations of a location. Google Street View, publicly available from Google Inc., for instance, provides a series of contiguous panoramic photographs and or image bubbles at or near ground-level constituting one example of such a near ground-level map. Such a map need not be limited to ground surface but may further include maps of building layouts/interiors, and/or other detailed low altitude maps, map applications and/or map systems. In yet further embodiments, as described in later sections herein, a ground map may be comprised of one or more near ground level photographs imbedded with additional location data such as utility locate information, object information, and/or other data or information. Examples of one implementation of such a near ground-level map comprised of the low altitude aerial photography is disclosed in co-assigned pending U.S. patent application Ser. No. 13/766,670, entitled OPTICAL GROUND TRACKING LOCATOR DEVICES AND METHODS, filed Feb. 13, 2013, as well as in U.S. Provisional Patent Application Ser. No. 62/019,715, entitled STEREO OPTICAL GROUND TRACKING APPARATUS, SYSTEMS, AND METHODS, filed Jul. 1, 2014, the contents of each are incorporated by reference herein.

Figure 3:
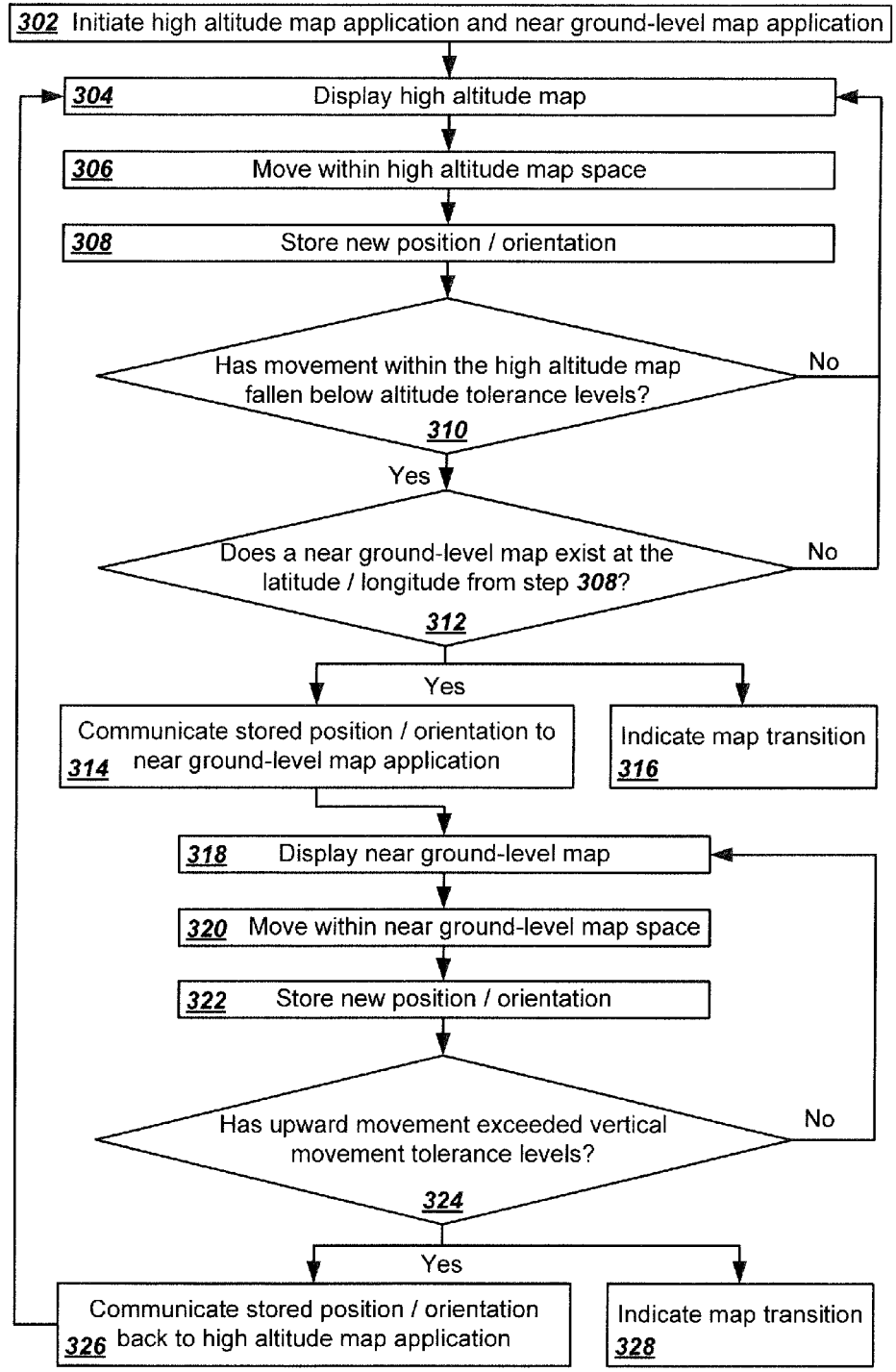
FIG. 3 illustrates details of an embodiment of a method for transitioning between high altitude maps and/or map applications/systems and near ground-level maps and/or map applications/systems.

In some embodiments, transitioning between two or more maps, map applications, and/or map systems may be seamless so as to not significantly interfere with or distract from a user's interaction with the mapping application or system. Details of one embodiment of such a transitioning process are shown in FIG. 3. For example, the method embodiment of FIG. 3 may be used to provide a user an initial overview of a location from a high altitude map application/system but may, as the user approaches nearer the ground or other mapped surface, seamlessly transition to a more detailed view of a location provided from a near ground-level map application. One example of such a transition is a seamless transition between a Google Earth aerial view and a Google Earth Street View display. Both map applications may be configured with an identical or nearly identical control scheme as discussed previously herein.

Referring still to FIG. 3, in step 302 a high altitude map application and near ground-level map application are initiated. In step 304, the high altitude map or mapping object of the high altitude map application may be displayed. In alternate embodiments, the map or mapping object from either map application may selected by a user or be predetermined to be first displayed. In step 306, a movement and/or rotation in the high altitude map space may be made, such as from a control signal with control data as provided from an UID. In a subsequent step 308, the position and orientation within the map may be stored. For instance, a heading and latitude and longitude position may be stored.

In step 310, a decision is made as to whether the movement from step 306 has fallen below a predetermined altitude tolerance level or other tolerance level. The predetermined altitude level may be user determined and/or a preset in the particular application/system or may be dynamically determined in some applications. If such movement has not fallen below the predetermined altitude tolerance level (e.g., a zoomed elevation has not fallen below a threshold elevation), the method may return to step 304.

However, if such movement has fallen below the predetermined altitude tolerance level of step 310, another decision may be made in step 312 as to whether a near ground-level map or mapping object exists at the latitude and longitude position stored at step 308. If a near ground-level map does not exist at the stored latitude and longitude position, the method may return to step 304. If a near ground-level map does exist at the stored latitude and longitude position, the method may continue to step 314 where the stored latitude and longitude position and heading from the high altitude map may be communicated to the ground map application. In an optional parallel step 316, an indication of the transition in maps or map applications/systems occurring may be provided to the user. For instance, the UID may provide haptic feedback and/or a light pattern/color to indicate the transition and/or audio alerts or other indications.

Additional or alternate indications may also be provided on the mapping application, such as by changes in map or map object presentation, alarms, or other indications. The map applications/systems may further be configured to display a virtual indicator to indicate a transition between map applications/systems. In step 318, the ground map or mapping object of the near ground-level map application may be displayed. In step 320, a movement and/or rotation in the near ground-level map space may be made. In step 322, the position and orientation within the near ground-level map may be stored, which may include data defining a heading, latitude and longitude position, and movements along the vertical Z axis.

In step 324, a decision may be made as to whether the degree of any upward movement along the Z axis has exceeded a predetermined vertical movement tolerance level. If the vertical movement tolerance level has not been exceeded, the method may loop back and repeat, returning to step 318. If the vertical movement tolerance level has been exceeded, in step 326 the stored latitude and longitude position and heading from the near ground-level map may be communicated to the high altitude map application. In an optional parallel step 328, an indication of the transition in maps or map applications/systems occurring may be provided to the user. Subsequent to step 326, the method of FIG. 3 may then return to step 304, displaying the high altitude map or mapping object of the high altitude map application.

Figure 4:
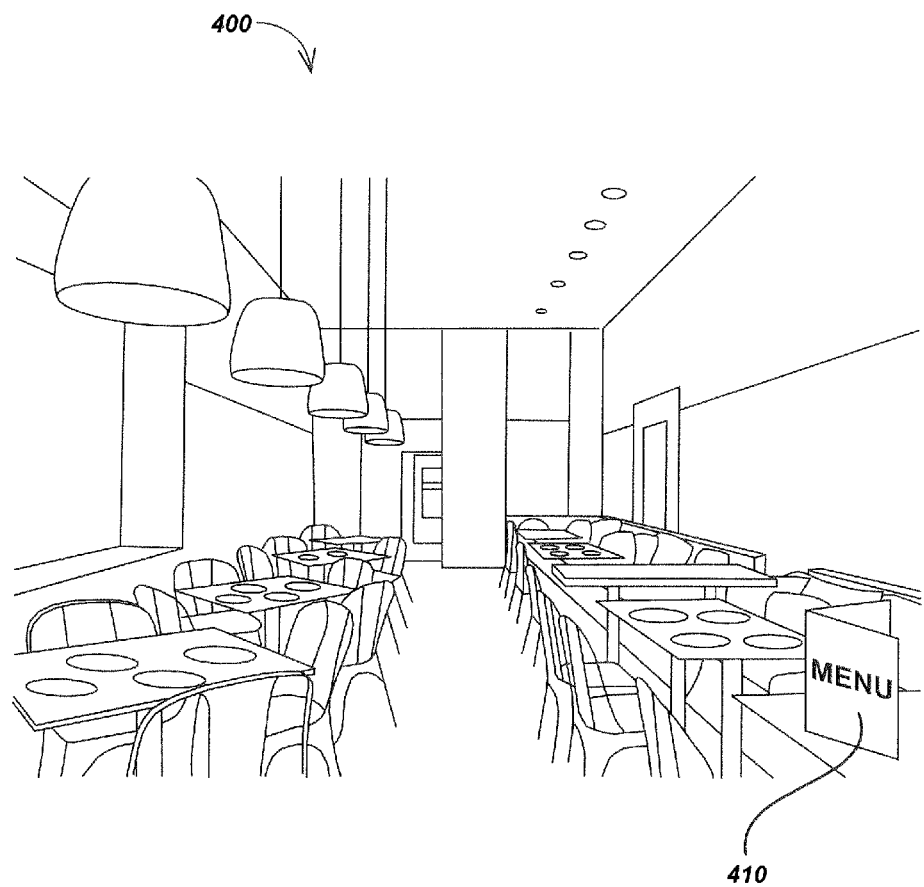
FIG. 4 illustrates an example embodiment of an alternate near ground-level map from a map application/system.

Turning to FIG. 4, in some embodiments, the near ground-level maps may include mapped locations within buildings and/or other structures, systems, or objects. The exemplary interior near ground level map 400 may allow movement within and may further include imbedded virtual objects such as the virtual restaurant menu 410. In some such embodiments, a virtual object such as the virtual restaurant menu 410 in FIG. 4 may be selected, manipulated, and/or otherwise be enabled to interact with a user, such as through the mapping system/application and/or a separate driver or application program. For instance, a squeeze of the UID's actuator and/or click of one or both of the buttons may indicate a selection and/or manipulation of the virtual restaurant menu 410 and/or other virtual objects. Once the menu 410 is selected, items within the menu 410 may further be selected with the same UID.

Further clicks and/or actuator squeeze deformations may allow the user to select/order from the virtual menu 410. In further near ground-level maps, a museum or other building interior may be mapped and contain other virtual objects within. For instance, museum exhibits may be selected, manipulated, and/or otherwise be configured to interact with and/or be interacted with by the user. In such uses, a touchscreen or optionally a UID with at least six degrees of freedom, rotations and zooming of such virtual objects may allow for perspectives and details not normally available. Other interior near ground-level maps may include but are not limited to other internal mapping of pipes and other conduits, medical mapping, mapping of subterranean caverns or other passageways, maps of locations underwater, and/or other interior locations.

Figure 5A:
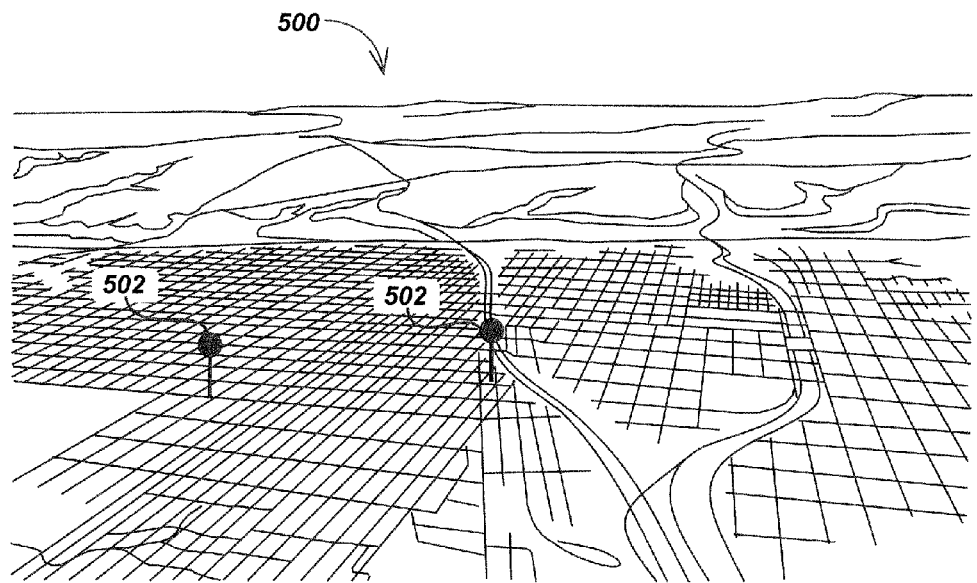
FIG. 5A illustrates an example embodiment of a high altitude map with location indicators from a high altitude map application/system.

In yet a further embodiment, one or both of the map applications of the methods discussed herein may include maps or mapping objects containing buried utility information. As illustrated in FIG. 5A, a high altitude map 500 may be similar to the high altitude 200 of FIG. 2A, with the inclusion of one or more location indicators 502 notating positions within the map area that contain points of interest. For instance, the location indicators 502 of high altitude map 500 may include the positions where buried utility locate information/maps are located. Subsequent user interactions with the mapping application or system, such as via a UID, may implement display of movements relative to the presented view and/or seamless transitions to other views based on different maps or mapping objects.

Figure 5B:
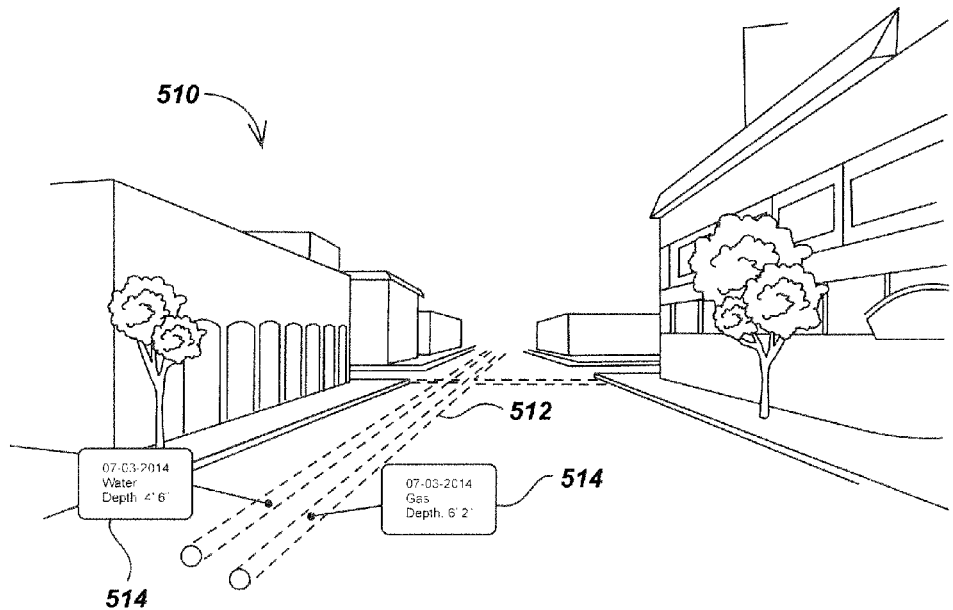
FIG. 5B illustrates an example embodiment of a near ground-level utility map and/or map application/system with imbedded buried utility information.

Turning to FIG. 5B, a near ground-level utility map 510 may be one of the maps as described in pending U.S. patent application Ser. No. 12/947,503, entitled IMAGE-BASED MAPPING LOCATING SYSTEM, filed Nov. 16, 2010, U.S. patent application Ser. No. 14/148,649, entitled MAPPING LOCATING SYSTEMS AND METHODS, filed Jan. 1,2014, OPTICAL GROUND TRACKING LOCATOR DEVICES AND METHODS, filed Feb. 13, 2013 OPTICAL GROUND TRACKING LOCATOR DEVICES AND METHODS, filed Feb. 13, 2013, U.S. patent application Ser. No. 13/766,670, entitled OPTICAL GROUND TRACKING LOCATOR DEVICES AND METHODS, filed Feb. 13, 2013 and U.S. patent application Ser. No. 14/752,834, entitled GROUND TRACKING APPARATUS, SYSTEMS, AND METHODS, filed Jun. 27, 2015, the contents of each are incorporated by reference herein. The near ground-level utility map 510 may contain a depiction of detected utility location 512 as well as various locate details 514. The locate details, 514 may include, but are not limited to, the date of the locate operation, depth of the detected utility, type of utility, ground surface position/coordinates, current data (in the conductor) and/or other data or information, such as is described in the incorporated applications.

Figure 6:
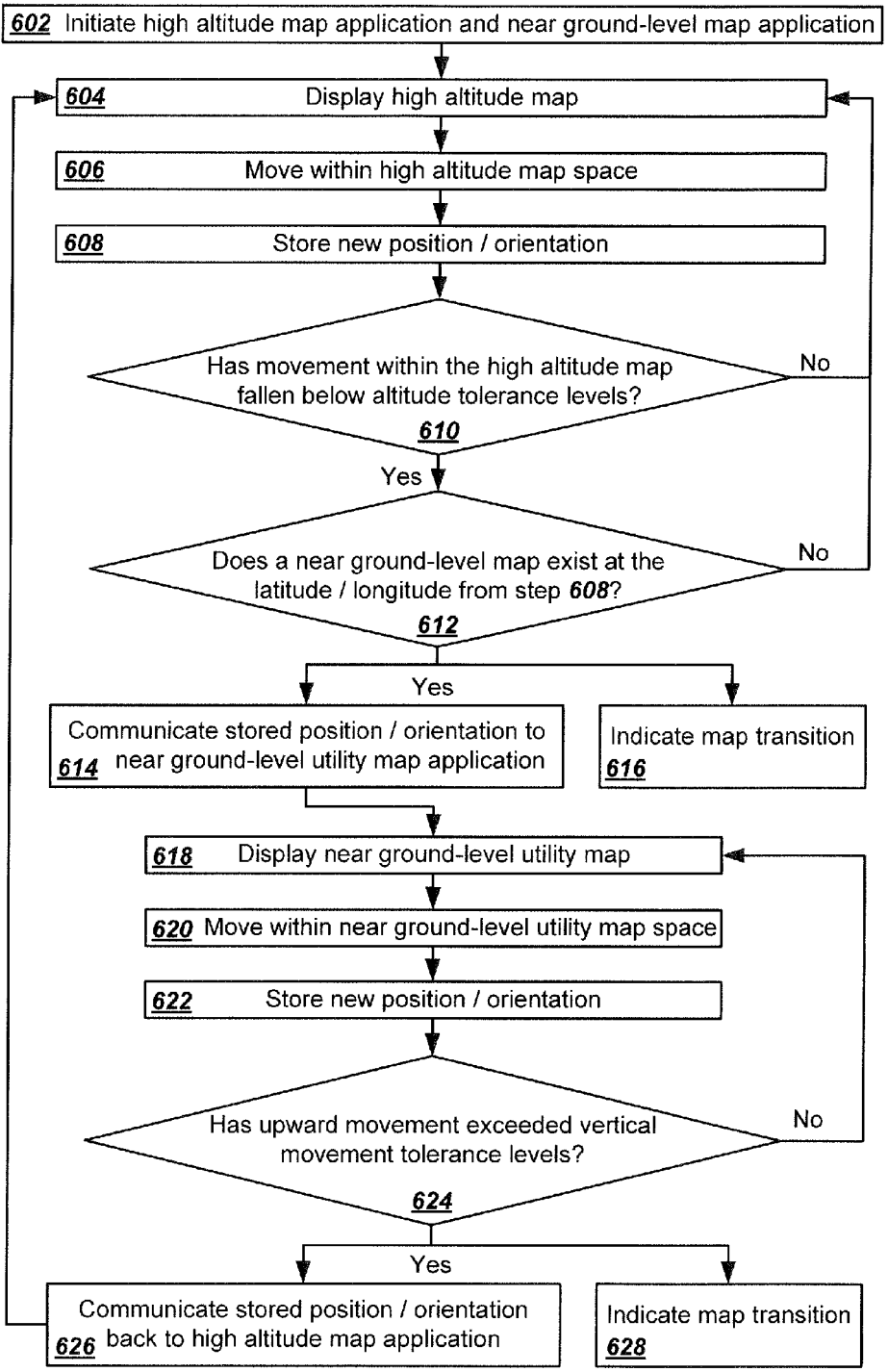
FIG. 6 illustrates details of an embodiment of a method for transitioning between high altitude maps and/or map applications/systems and near ground-level utility maps and/or map applications/systems.

Turning to FIG. 6, details of an embodiment of a method for transitioning between a high altitude map which may be either the high altitude map 200 of FIG. 2A, the high altitude map 400 of FIG. 4A, or other high altitude maps or mapping objects is illustrated. This method may be similar to those described previously herein. For example, in step 602 a high altitude map application and near ground-level utility map application may be started. In step 604, the high altitude map of the high altitude map application may be displayed. In alternate embodiments, the map from either map application may selected by a user or be predetermined to be first displayed. In step 606, a movement and/or rotation in the high altitude map space may be made, such as with a UID as described in the incorporated applications. In step 608, the position and orientation within the map may be stored. For instance, a heading and latitude and longitude position may be stored. In step 610, a decision is made as to whether the movement from step 606 has fallen below a predetermined altitude tolerance level. The predetermined altitude level may be user determined and/or a preset in the particular application/system or may be dynamically determined. If such movement has not exceeded the predetermined altitude tolerance level, the method may return to step 604.

If such movement has exceeded the predetermined altitude tolerance level of step 610, another decision may be made in step 612 as to whether a near ground-level utility map exists at the latitude and longitude position stored at step 608. If a near ground-level utility map does not exist at the stored latitude and longitude position, the method may return to step 604. If a near ground-level utility map does exist at the stored latitude and longitude position, the method may continue to step 614 where the stored latitude and longitude position and heading from the high altitude map may be communicated to a near ground-level utility map application. In an optional parallel step 616 an indication of the transition in maps or map applications/systems occurring may be provided to the user. For instance, the UID may provide haptic feedback and/or a light pattern/color and/or audio alert to indicate the transition. The map applications/systems may further be configured to display a virtual indicator to indicate a transition between map applications/systems.

In step 618, the near ground-level utility map of the near ground-level utility map application may be displayed. In step 620, a movement and/or rotation in the near ground-level utility map space is made. In step 622, the position and orientation within the map is stored which may include a heading, orientation, latitude and longitude position, and movements along the vertical Z axis. In step 624, a decision may be made as to whether the degree of any upward movement along the Z axis has exceeded a predetermined vertical movement tolerance level. If the vertical movement tolerance level has not been exceeded, the method may return to step 618. If the vertical movement tolerance level has been exceeded, in step 626 the stored latitude and longitude position and heading from the near ground-level map may be communicated to the high altitude map application. In an optional parallel step 628, an indication of the transition in maps or map applications/systems occurring may be provided to the user.

Subsequent to step 626, the method of FIG. 6 may return to step 604, displaying the high altitude map of the high altitude map application. In alternate embodiments, selection of a near ground-level utility map from a high altitude map may occur through a squeeze of the UID's actuator and/or click of one or both of buttons versus a change in elevation. Furthermore, in some embodiments the squeezing of the UID's actuator and/or clicking of buttons may allow for the selection of a virtual object and/or menu. This may include the selection, manipulation, control, and/or interactions with included embedded data/objects. Such embedded data/objects may include buried utility locations and/or information such as the detected utility location 512 illustrated in FIG. 5B and/or other locate details such as the locate details 514 illustrated in FIG. 5B.

In some embodiments, the transition between maps and/or map applications/systems may occur relative to proximity rather than altitude. For instance, an overview map of a building may switch to a detailed map of the building as the movement occurs along a horizontal plane towards the building's wall. The detailed map may further reveal aspects of the building walls which may normally be hidden such as the location of utilities.

Figure 7:
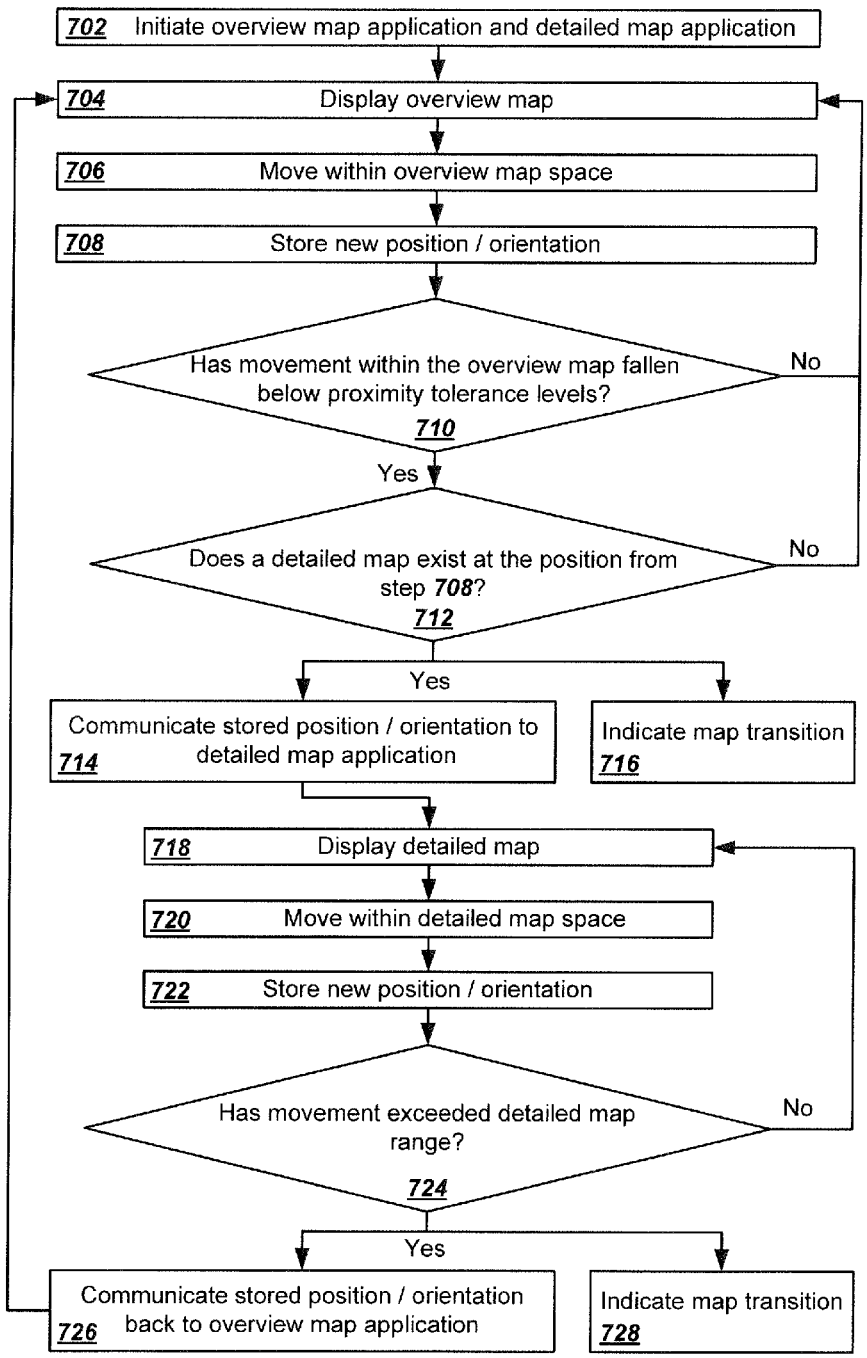
FIG. 7 illustrates details of an embodiment of a method for transitioning between overview maps and/or map applications/systems and detailed maps and/or map applications/systems.

Details of an embodiment of a method for transitioning between overview maps and detailed maps based on proximity are illustrated in FIG. 7. Such a method may be used in mapped surfaces of any scale-dependent visualizations/representations. In step 702, an overview map application and detailed map application are started. In step 704, an overview map of the overview map application may be displayed. In alternate embodiments, the map from either map application may be selected by a user or be predetermined to be first displayed. In step 706, a movement and/or rotation in the overview map space may be made.

In step 708, data defining the position and orientation within the map may be stored. For instance, an orientation in three dimensional space as well as latitude, longitude, and altitude positions may be stored. In step 710, a decision may be made as to whether the movement from step 706 has fallen below a proximity tolerance level(s). The proximity tolerance level(s) may be user determined and/or a preset in the particular application/system or may be dynamically determined. If such movement has not fallen below the proximity tolerance level(s), the method may return to step 704. However, if such movement has fallen below the proximity tolerance level of step 710, another decision may be made in step 712 as to whether a detailed map exists at the position stored at step 708. If a detailed map does not exist at the position, the method may return to step 704. If a detailed map does exist at the position, the method may continue to step 714 where the orientation and position from the overview map may be communicated to the detailed map application. In an optional parallel step 716 an indication of the transition in maps or map applications/systems may be provided to the user. For instance, the UID may provide haptic feedback and/or a light pattern/color and/or audio alert to indicate the transition. The map applications/systems may further be configured to display a virtual indicator to indicate a transition between map applications/systems.

In step 718, the detailed map of the detailed map application may be displayed. In step 720, a movement and/or rotation in the detailed map space may be made. In step 722, the position and orientation within the detailed map may be stored. In step 724, a decision may be made as whether the movement from step 720 has exceeded the range of the current detailed map. If the movement has not exceeded the range of the detailed map, the method may return to step 718. However, if the movement has exceeded the range of the detailed map, in a step 726 the stored position and orientation from the detailed map may be communicated back to the overview map application. In an optional parallel step 728, an indication of the transition in maps or map applications/systems may be provided to the user.

Subsequent to step 726, the method of FIG. 7 may return to step 704, displaying the overview map of the overview map application at the previous position and orientation from the detailed map. In such a method, input from a UID, such as in the form of a control signal with control data, may be used to manipulate various other aspects of the maps and/or map applications/systems and/or virtual objects within the maps. In some embodiments, the squeezing of the UID's actuator and/or clicking of buttons may allow for the selection of a virtual object and/or menu. Such objects and/or menus may further be manipulated, controlled, and/or interacted with through use of the UID. For instance, in a map including a chemical bond, an element of that bond may be selected through a squeeze of the UID's actuator and further rotated or moved about through additional input with the UID.

Figure 8A:
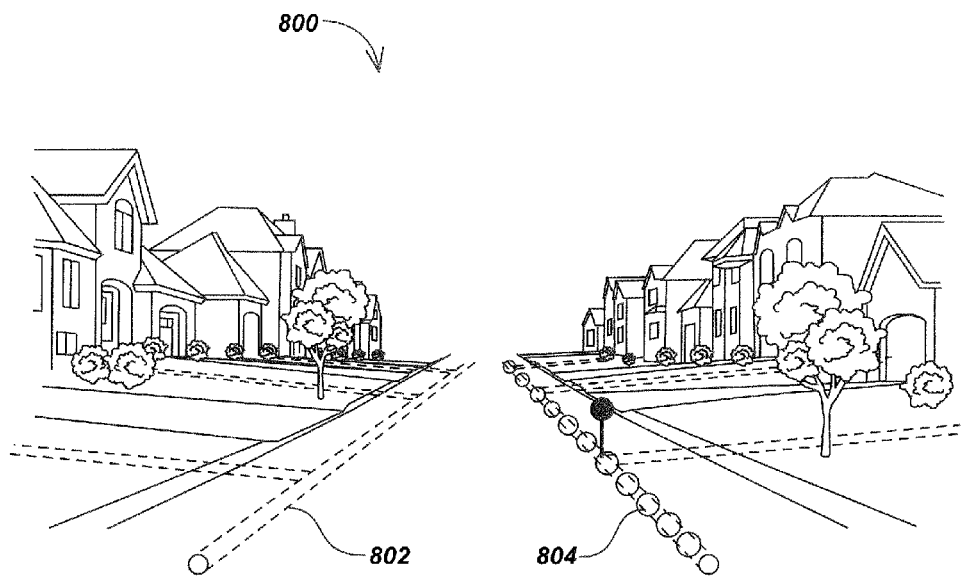
FIG. 8A illustrates details of an embodiment of a near ground-level pipe inspection map.

The methods and systems disclosed herein may further be applied to maps/models of a variety of other applications/fields in a similar fashion. For instance, a map and/or application/system may include pipe inspection images and/or information. As illustrated in FIG. 8A, a near ground-level pipe inspection map 800 may be a near ground-level map as described in previous sections herein that may contain buried pipe and/or other utility locations 802 and may further include one or more indicators of available pipe inspection locations 804.

Figure 8B:
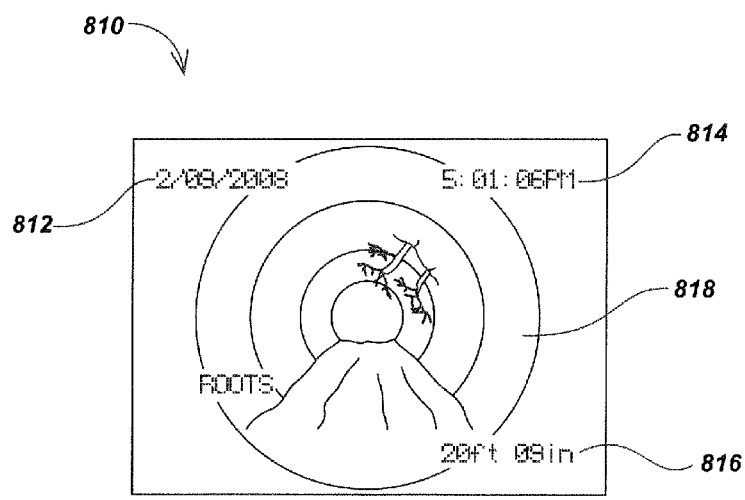
FIG. 8B illustrates details of an embodiment of an interior pipe inspection map.
Figure 8C:
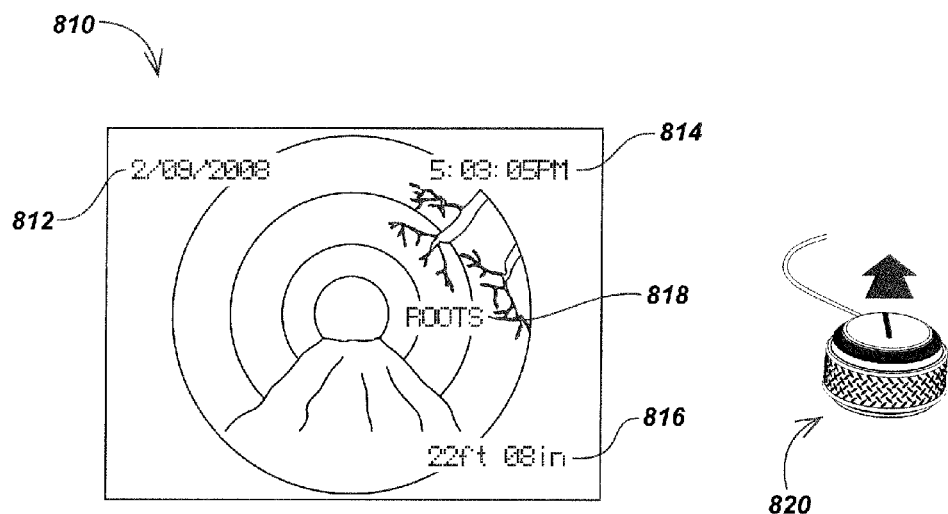
FIG. 8C illustrates details of the interior pipe inspection map embodiment showing a forward movement/displacement.

As illustrated in FIG. 8B, an interior pipe inspection map 810 may be comprised of a series of images and/or video footage from within a pipe that may further include other pipe inspection information/data. Other information/data may include, but is not limited to, pipe inspection date 812, pipe inspection time 814, depth of inspected pipe 816, user generated indicators such as label 818 indicating the presence and location of roots or other problems within the pipe or sewer line, and/or other pipe inspection information/data. An interior pipe inspection map such as the interior pipe inspection map 810 may be configured such that displacements of a UID's actuator may be used to determine movements within the mapped pipe or sewer line. For instance, as illustrated in FIG. 8C, a forward displacement with UID 820, which may be a UID of the variety previously discussed and referenced herein, may be used to control forward movements within the pipe and/or pipe inspection.

Figure 8D:
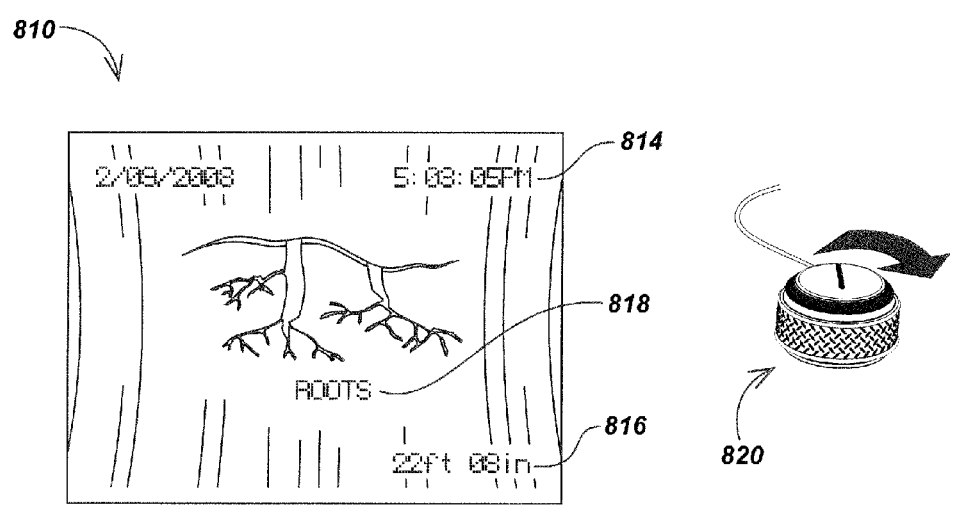
FIG. 8D illustrates details of the interior pipe inspection map embodiment showing a rotation of perspective within the mapped pipe.

Illustrated in FIG. 8D, rotations of the actuator on the UID 820 may control rotations within the pipe and/or pipe inspection and allow the user to inspect interior sides of the pipe. Such rotations may allow for the closer and/or more detailed inspection of roots or other problem areas within the pipes and/or sewer line. Other displacements of a UID's actuator may further control other movements and/or rotations within the mapped pipe and/or pipe inspection. For instance other displacements may allow for movements including, but not limited to, turning down mapped branches of the pipe, other rotations to gain additional perspective of the top, bottom, and/or side interiors of the pipe, zooming in/out of areas of interest, and any other movements gained through the use of a UID with six or greater degrees of freedom. In some embodiments, an upward displacement of the UID's actuator may indicate a transition from an interior pipe inspection map to another map such as a near ground-level map or high altitude map.

Figure 9A:
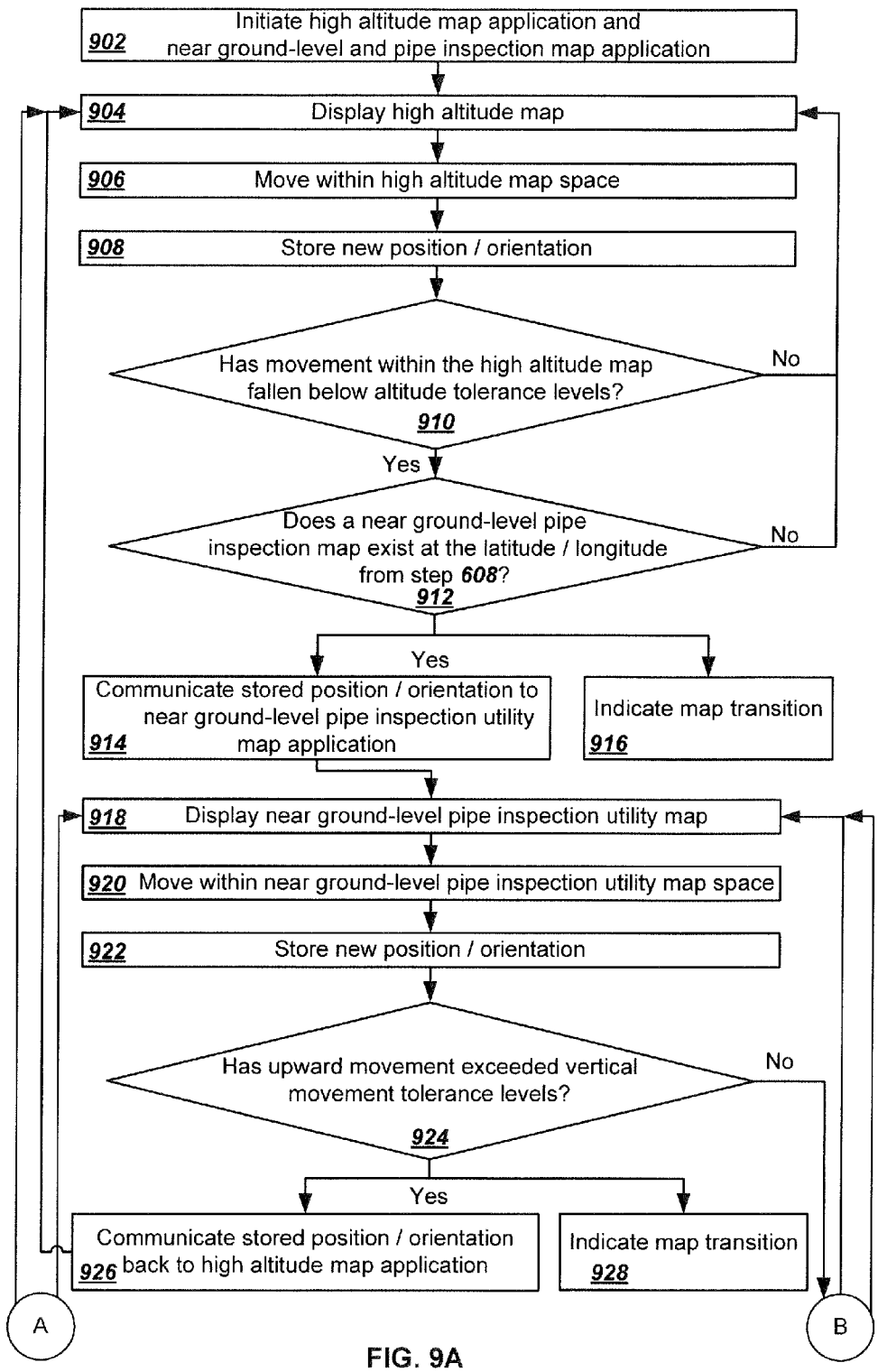
FIG. 9A illustrates details of an embodiment of part of a method to transition between display of multiple maps or images.
Figure 9B:
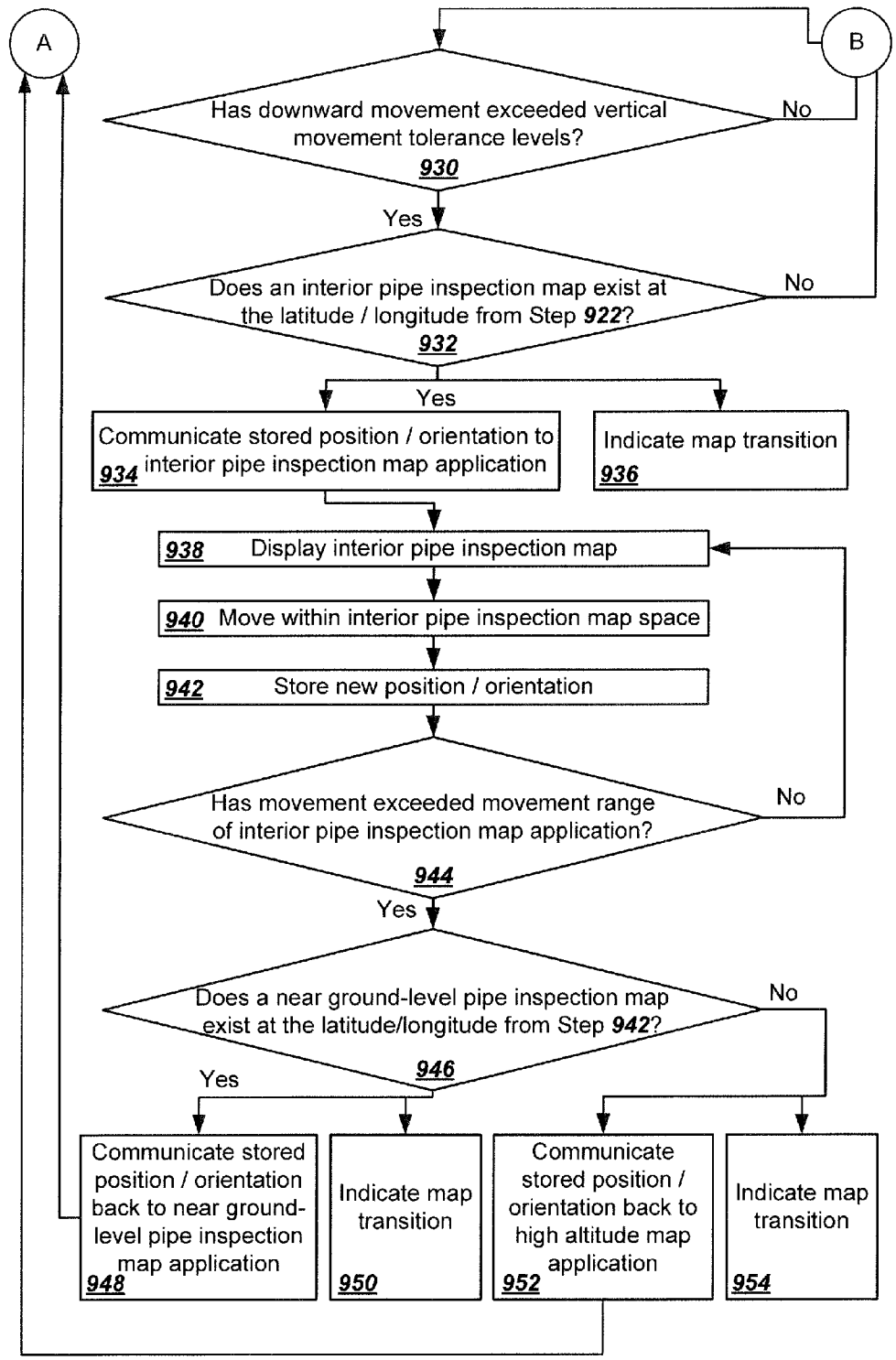
FIG. 9B illustrates additional details of the method to transition between display of multiple maps or images of FIG. 9A.
Figure 10:
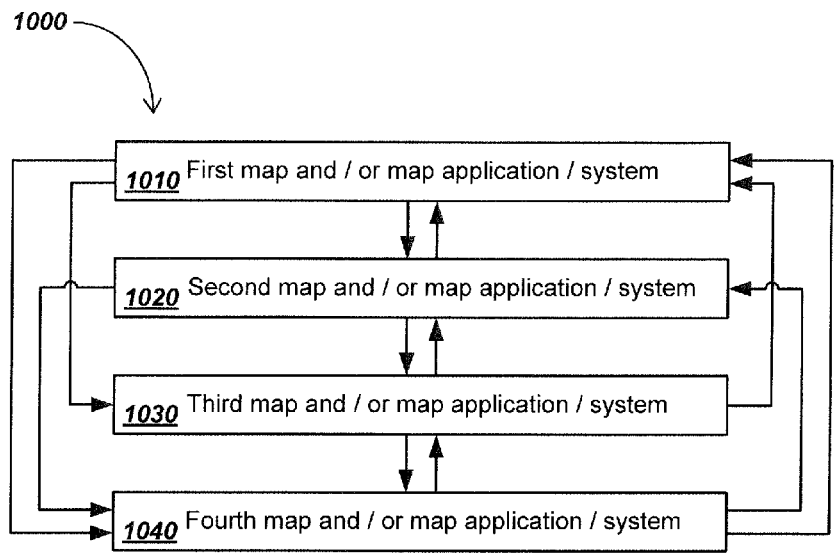
FIG. 10 illustrates details of an embodiment of a method of implementing transitions between various maps and/or map applications/systems.
Figure 11:
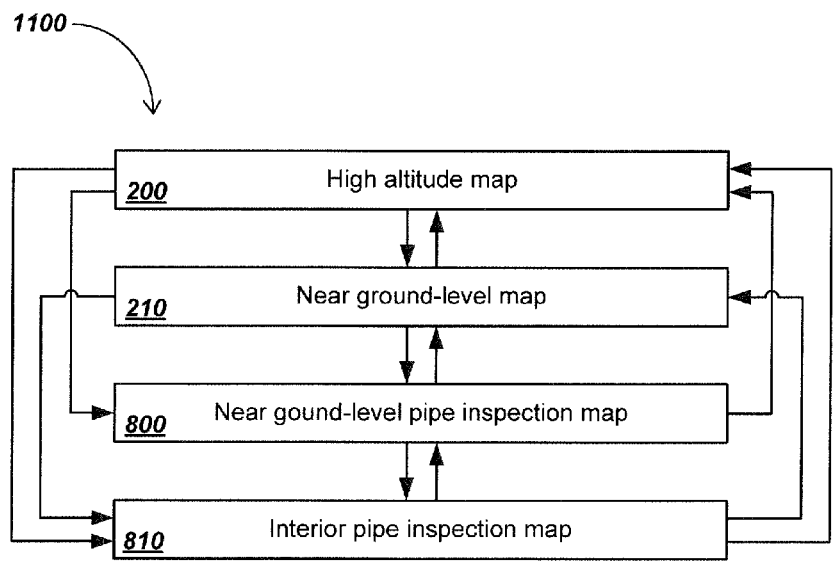
FIG. 11 illustrates details of an embodiment of a method of implementing transitions between exemplary maps and/or map applications/systems.

In some embodiments, more than two maps may be used in a map transition method in accordance with aspects of the present disclosure. In FIGS. 9A and 9B, details of an embodiment of a method for transitioning between three different maps and/or map applications is illustrated. The method of FIGS. 9A and 9B may utilize a high altitude map, a near ground-level pipe inspection map, and an interior pipe inspection map. The high altitude map of FIGS. 9A and 9B may be the high altitude map 200 of FIG. 2A, the high altitude map 500 of FIG. 5A, overview map discussed with FIG. 7, or other high altitude/overview map variety as disclosed herein. The near ground-level pipe inspection map of FIGS. 9A and 9B may be near ground-level pipe inspection map 800 illustrated in FIG. 8A. In alternate embodiments, the near ground-level pipe inspection map may instead be the near ground-level map 210 of FIG. 2B, interior near ground level map 400 of FIG. 4, near ground-level utility map 510 of FIG. 5B, detailed map discussed with FIG. 7, or other near ground-level/detailed map variety as disclosed herein. The interior pipe inspection map of FIGS. 9A and 9B may be the interior pipe inspection map 810 illustrated in FIGS. 8B-8C. In alternate embodiments, the interior pipe inspection map may instead be map and/or map application/system that may further detail aspects of the near ground-level/detailed map.

As shown in FIGS. 9A and 9B, in step 902 a high altitude map application, near ground-level and pipe inspection map application, and interior pipe inspection map application are started. In step 904, the high altitude map of the high altitude map application may be displayed. In alternate embodiments, the map or mapping object from any of the map applications may be selected by a user or be predetermined to be first displayed. In step 906, a movement and/or rotation in the high altitude map space may be made. In step 908, the position and orientation within the map may be stored. For instance, a heading and latitude and longitude position may be stored.

In step 910, a decision may be made as to whether the movement from step 906 has fallen below a predetermined altitude tolerance level. The predetermined altitude level may be user determined and/or a preset in the particular application/ system. If such movement has fallen below the predetermined altitude tolerance level, the method may return to step 904. If such movement has not fallen below the predetermined altitude tolerance level of step 910, another decision may be made in step 912 as to whether a near ground-level pipe inspection map exists at the latitude and longitude position stored at step 908. If a near ground-level pipe inspection map does not exist at the stored latitude and longitude position, the method may return to step 904 to repeat.

In an alternate method embodiment, an additional decision step may be included to check if an interior pipe inspection map exists when there is not a near ground-level pipe inspection map at the stored latitude and longitude. In such an alternate method, if there is an interior pipe inspection map at the present latitude and longitude, follow step 908 of the method in FIGS. 9A and 9B; in an alternate method, position and orientation may be communicated to the interior pipe inspection map application. The method may then continue at step 938 in FIGS. 9A and 9B by displaying the interior pipe inspection map.

Returning back to the method of FIGS. 9A and 9B, if a near ground-level utility map does exist at the decision of step 912, the method may continue to step 914 where the stored latitude and longitude position and heading from the high altitude map may be communicated to the near ground-level pipe inspection map application. In an optional parallel step 916 an indication of the transition in maps or map applications/systems occurring may be provided to the user. For instance, the UID may provide haptic feedback and/or a light pattern/color and/or audio alert to indicate the transition.

The map applications/systems may further be configured to display a virtual indicator to indicate a transition between map applications/systems. In step 918, the near ground-level utility map of the near ground-level pipe inspection map application may be displayed. In step 920, a movement and/or rotation in the near ground-level pipe inspection map space may be made. In step 922, the position and orientation within the map may be stored which may include a heading, latitude and longitude position, and movements along the vertical Z axis. In step 924, a decision may be made as to whether the degree of any upward movement along the Z axis has exceeded a predetermined vertical movement tolerance level. If the upward movement has exceeded vertical movement tolerance levels, in step 926 the stored latitude and longitude position and heading from the near ground-level pipe inspection map may be communicated to the high altitude map application.

In an optional parallel step 928, an indication of the transition in maps or map applications/systems occurring may be provided to the user. Subsequent to step 926, the method of FIG. 9 may return to step 904, displaying the high altitude map of the high altitude map application. From decision step 924, if the upward movement has not exceeded vertical movement tolerance levels, in step 930 another decision may be made as to whether downward movement has exceeded vertical movement tolerance levels. If there has been no downward movement to exceed vertical movement tolerance levels in step 930, the method may return to step 918.

If there has been downward movement exceeding vertical movement tolerance levels in step 930, in decision step 932, a determination may be made as to whether an interior pipe inspection map exists at the latitude and longitude stored at step 922. If there is not an interior pipe inspection map that exists at the latitude and longitude, the method may repeat back at step 918. If there is an interior pipe inspection map at the latitude and longitude, in a step 934 the stored latitude and longitude position and heading from the near ground-level pipe inspection map may be communicated to the interior pipe inspection map application.

In an optional parallel step 936, an indication of the transition in maps or map applications/systems occurring may be provided to the user. Subsequent to step 934, in a step 938 the interior pipe inspection map may be displayed at the position and orientation communicated from the near ground-level pipe inspection map at step 936. In a subsequent step 940, a movement and/or rotation in the interior pipe inspection map space may be made. In a subsequent step 942, the position and orientation within the map is stored. In a subsequent step 944, a decision may be made as to whether the movement has exceeded the movement range of the interior pipe inspection map application.

The movement range of the interior pipe inspection map application may be user determined and/or a preset in the particular application/system. If the movement has not exceeded movement tolerance levels of step 944, the method may repeat back at step 938. If the movement has exceeded movement tolerance levels of step 944, the method may continue to a decision step 946 where a determination is made as to whether a near ground-level pipe inspection map exists at the position stored at step 942. From step 946, if a near ground-level pipe inspection map does exist at the latitude and longitude, in a step 948 the position and orientation may be communicated back to the near ground-level pipe inspection application. In an optional step 950 parallel to step 948, an indication of the transition in maps or map applications/systems occurring may be provided to the user. From step 948, the method shown in FIGS. 9A and 9B may repeat back from step 918. From decision step 946, if a near ground-level pipe inspection map does not exist at the latitude and longitude, in a step 952 the position and orientation may be communicated back to the high altitude map application.

In an optional step 954 parallel to step 952, an indication of the transition in maps or map applications/systems occurring may be provided to the user. From step 952, the method shown in FIGS. 9A and 9B may repeat back from step 904. In alternate embodiments, selections/transitions between maps may also or instead be initiated through a squeeze of the UID's actuator and/or click of one or both of buttons versus a change in elevation. Furthermore, in some embodiments the squeezing of the UID's actuator and/or clicking of buttons may allow for the selection of a virtual object and/or menu. This may include the selection, manipulation, control, and/or interactions with included embedded data/objects. Such embedded data/objects may include pipe inspection locations and/or information such as the pipe inspection location 804 illustrated in FIG. 8A and/or other pipe inspection details such as the pipe inspection details 812, 814, 816, and 818 illustrated in FIGS. 8B-8D.

The various map and/or map systems discussed within exemplary embodiments herein may be substituted for various other types of map and/or map systems. For instance, the various map and/or map systems of FIGS. 9A and 9B may instead be maps created or used for utility locating operations. Further map and map system embodiments that may be used may include, but is not limited to, various virtual tour type maps. For instance, theme park tours, restaurant tours, aircraft tours, factory tours, museum tours, virtual shopping experiences, mapping/tour of machine and/or machine components, and/or other virtual tour type maps. In some such maps, additional information and functionality may be included within the map/map system. For instance, the virtual tour of a machine may be imbued with component information allowing a user to virtual tour the inside of a machine, select a component, retrieve information regarding the component which may include service and/or maintenance instructions. In other virtual tour type mapping systems, such as the tour of an aircraft, may allow a user to tour the inside of an aircraft of a commercial airline and select seating. Other maps and mapping systems may include other information and functionality.

The methods herein may be adapted to work with any number of maps and/or map applications/systems. Furthermore, transitions between the maps, mapping objects, and/or map applications may occur between any of the maps, mapping objects, and/or map applications at any level. As illustrated in the system 1000 of FIG. 10 comprised of a first map and/or map application/system 1010, second map and/or map application 1020, third map and/or map application 1030, and a fourth map and/or map application 1040, the transitions may occur between any other map and/or map application/system within system 1000. Such transitions may be initiated through various ways and/or through various criteria. For instance, proximity to a particular map and/map application/system with a common coordinate system, through a measure of altitude, elevation, azimuth, compass angle, squeezing of a UID's actuator and/or click of the buttons, and/or other transition criteria may be used.

In the exemplary system 1100, four different maps are used; the high altitude map 200 (also from FIG. 2A), near ground-level map 210 (also from FIG. 2A), near ground-level pipe inspection map 800 (also from FIG. 8), and the interior pipe inspection map 810 (also from FIG. 8) which may include location site image bubbles. Within system 1100 transitions between maps may occur between any other maps and/or map applications/systems.

The methods and systems disclosed herein may be applied to various other applications/industries which may include, but are not limited to; medical imaging/mapping such as computer-assisted tomography (CT), computed axial tomography (CAT), magnetic resonance imaging (MRI), and/or positron emission tomography (PET) scans; geophysical models or data sets; nano-structures; CAD models; chemical models; models of cells/viruses; weather and climate models; models and/or data sets of the sky, outer space, galaxy, or universe; and/or any other models, maps, and/or data sets which may include large multidimensional data sets. Furthermore, the methods disclosed herein may be adapted to include any number of maps and/or map applications.

In one or more exemplary embodiments, certain functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed herein are examples of exemplary approaches. Based upon design preferences, it is understood that the specific order or hierarchy of steps or stages in the processes may be rearranged while remaining within the scope of the present disclosure. In addition, in some embodiments additional steps may be added, while in other embodiments certain steps may be deleted. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein and, for example, in a processing element as described, may be implemented or performed with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A processing element may furthering include or be coupled to one or more memory elements for storing instructions, data, and/or other information in a digital storage format.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the invention is not intended to be limited to the aspects shown herein, but is to be accorded the full scope consistent with the disclosure herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the appended claims and their equivalents.

We claim:

1. A method for providing controlled and seamless display transitions between utility inspection maps in a mapping application using a multi-axis magnetically sensed user interface device, the method comprising:
   rendering, on a display, a first map of a utility inspection site having one or more buried utilities placed below a ground surface, the first map comprising one or more aerial photographs of the utility inspection site;
   storing a three dimensional position and orientation information associated with the first map in a non-transitory memory of a device associated with the mapping application;
   receiving an output control signal generated by a displacement of an actuator element of the multi-axis magnetically sensed user interface device (UID) operably coupled to the display, wherein the output control signal defines a control action;
   determining, based at least in part on the control action, a second map of the utility inspection site to render; the second map comprising a series of contiguous panoramic near ground-level photographs of the utility inspection site imbedded with location information pertaining to the one or more buried utilities;
   retrieving the stored three dimensional position and orientation information associated with the first map from the non-transitory memory; and
   rendering the second map of the utility inspection site on the display, wherein the second map is rendered seamlessly from the rendering of the first map, and the second map preserves the three dimensional position and orientation associated with the first map.

2. The method of claim 1, wherein the first map comprises a vector-based map.

3. The method of claim 1, wherein the first map comprises a raster-based map.

4. The method of claim 1, wherein the second map comprises a vector-based map.

5. The method of claim 1, wherein the second map comprises a raster-based map.

6. The method of claim 1, wherein the second map is determined further based in part on data provided from the mapping application.

7. The method of claim 6, wherein the data provided from the mapping application is altitude data relative to a current ground surface coordinate position.

8. The method of claim 6, wherein the data provided from the mapping application is a distance above a reference surface or point.

9. The method of claim 6, wherein the data provided from the mapping application is three dimensional orientation data.

10. The method of claim 6, wherein the data provided from the mapping application is velocity data.

11. The method of claim 1, wherein the output control signal is provided responsive to an upward or downward control movement of the actuator element of the UID.

12. The method of claim 1, wherein the position is a latitude and longitude.

13. The method of claim 1, wherein the orientation is a compass heading.

14. The method of claim 1, wherein the orientation is an elevation or attitude.

15. The method of claim 1, further comprising:
   receiving, from a second UID control signal second data defining a second control action;
   determining, based at least in part on the second control action, a third map to render; and
   rendering the third map on the display.

16. The method of claim 1, wherein the multi-axis magnetically sensed UID is operable to sense motion in at least six degrees of freedom.

17. The method of claim 1, wherein the one or more buried utilities include a pipe or conduit.

18. The method of claim 1, wherein the second map comprises at least one virtual object related to inspection of the one or more buried utilities, the virtual object is manipulable by a user based on corresponding user's actions on the multi-axis magnetically sensed UID.

19. A method for providing controlled and seamless display transitions between different maps in a mapping application using a multi-axis magnetically sensed user interface device, the method comprising:
- rendering, on a display, a first map of a geographical location;
- storing a position, orientation, and altitude information associated with the first map in a non-transitory memory;
- receiving an output control signal generated from a displacement of an actuator element of the multi-axis magnetically sensed user interface device (UID) operably coupled to the display, wherein the output control signal defines a control action on the first map;
- evaluating, based on the control action, a change in altitude level associated with the first map;
- comparing the change in altitude level with a predetermined altitude tolerance level;
- determining, based at least in part on the comparison, a second map of the geographical location to render;
- retrieving the stored position and orientation information associated with the first map from the non-transitory memory; and
- rendering the second map on the display, wherein the second map is rendered seamlessly from the rendering of the first map, and the second map preserves the position and orientation associated with the first map,
- wherein at least one of the first map and the second map comprises a series of image bubbles including contiguous panoramic photographs of the geographical location and/or one or more objects within the geographical location.

20. A method for providing controlled and seamless display transitions between pipe inspection maps using a multi-axis magnetically sensed user interface device, the method comprising:
- rendering, on a display, a first pipe inspection map comprising one or more image bubbles including contiguous panoramic photographs of an exterior of a pipe;
- receiving an output control signal generated by a user displacement of an actuator element of the multi-axis magnetically sensed user interface device operably coupled to the display, wherein the output control signal defines a control action on the first pipe inspection map;
- determining, based at least in part on the control action, a second pipe inspection map to render, the second pipe inspection map comprising a series of contiguous images and/or video footage from an interior of the pipe; and
- rendering the second pipe inspection map on the display, wherein the second pipe inspection map is rendered seamlessly from the rendering of the first pipe inspection map, and wherein virtual movements in the interior of the pipe are determined and controlled by corresponding user displacements of the actuator element of the multi-axis magnetically sensed user interface device.

21. The method of claim 20, wherein the second pipe inspection map further comprises pipe inspection data imbedded in the contiguous images and/or video footage.

22. The method of claim 21, wherein the pipe inspection data include one or more of position, orientation and depth of the inspected pipe, pipe inspection date, pipe inspection time, and user generated indicators associated with the pipe inspection.

\* \* \* \* \*